US009602514B2

(12) United States Patent
Narayanan et al.

(10) Patent No.: US 9,602,514 B2
(45) Date of Patent: Mar. 21, 2017

(54) ENTERPRISE MOBILITY MANAGEMENT AND VERIFICATION OF A MANAGED APPLICATION BY A CONTENT PROVIDER

(71) Applicant: Box, Inc., Los Altos, CA (US)

(72) Inventors: Sowmiya Chocka Narayanan, San Jose, CA (US); Tom Carpel, East Palo Alto, CA (US); David Still, Menlo Park, CA (US)

(73) Assignee: Box, Inc., Redwood City, CA (US)

( * ) Notice: Subject to any disclaimer, the term of this patent is extended or adjusted under 35 U.S.C. 154(b) by 95 days.

(21) Appl. No.: 14/738,331

(22) Filed: Jun. 12, 2015

(65) Prior Publication Data

US 2015/0365416 A1 Dec. 17, 2015

Related U.S. Application Data

(60) Provisional application No. 62/012,894, filed on Jun. 16, 2014.

(51) Int. Cl.
*H04L 29/06* (2006.01)
*G06F 21/44* (2013.01)
(Continued)

(52) U.S. Cl.
CPC ............ *H04L 63/10* (2013.01); *G06F 21/105* (2013.01); *H04L 43/08* (2013.01);
(Continued)

(58) Field of Classification Search
CPC . H04L 63/0245; H04L 63/20; H04L 63/0281; H04L 63/102; H04W 12/06
See application file for complete search history.

(56) References Cited

U.S. PATENT DOCUMENTS 5,799,320 A 8/1998 Klug
5,848,415 A 12/1998 Guck
(Continued)

FOREIGN PATENT DOCUMENTS

CA 2724521 A1 11/2009
CN 101997924 A 3/2011
(Continued)

OTHER PUBLICATIONS

Citrix, "Reference Architectture for Mobile Device and App Management", Mar. 7, 2013, pp. 1-24, https://www.citrix.com/content/dam/citrix/en_us/documents/products-solutions/reference-architecture-for-mobile-device-and-app-management.pdf.*
(Continued)

*Primary Examiner* — Jung Kim
*Assistant Examiner* — Carlos M De Jesus Lassala
(74) *Attorney, Agent, or Firm* — Perkins Coie LLP

(57) ABSTRACT

A non-SDK based scalable technology for integrating multiple mobile device management (MDM) service providers into a content provider platform (or server) is described herein. More specifically, the technology described herein facilitates enterprise mobility management through verification of a managed application associated with an enterprise via the content provider platform. In some embodiments, the content provider platform comprises a cloud-based collaboration and/or storage environment ("cloud-based platform server") that prevents an unmanaged application from gaining access to the cloud-based collaboration and/or storage server.

20 Claims, 18 Drawing Sheets

(51) Int. Cl.
*H04L 12/26* (2006.01)
*G06F 21/10* (2013.01)
*H04W 12/06* (2009.01)

(52) U.S. Cl.
CPC ........ *H04L 63/0245* (2013.01); *H04L 63/102* (2013.01); *H04W 12/06* (2013.01); *H04L 63/0281* (2013.01)

(56) References Cited

U.S. PATENT DOCUMENTS

| | | |
|---|---|---|
| 5,864,870 A | 1/1999 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,347,276 B2 | 1/2013 | Schadow |
| 8,358,701 B2 | 1/2013 | Chou et al. |
| 8,429,540 B1 | 4/2013 | Yankovich et al. |
| 8,464,161 B2 | 6/2013 | Giles et al. |
| 8,527,549 B2 | 9/2013 | Cidon |
| 8,549,066 B1 | 10/2013 | Donahue et al. |
| 8,549,511 B2 | 10/2013 | Seki et al. |
| 8,607,306 B1 | 12/2013 | Bridge et al. |
| 8,849,955 B2 | 9/2014 | Prahlad et al. |
| 2001/0027492 A1 | 10/2001 | Gupta |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0230624 A1 | 11/2004 | Frolund et al. |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0050228 A1 | 3/2005 | Perham et al. |
| 2005/0063083 A1 | 3/2005 | Dart et al. |
| 2005/0091309 A1* | 4/2005 | Bookman ........... H04L 63/0428 709/203 |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredriksen et al. |
| 2006/0053088 A1 | 3/2006 | Ali et al. |
| 2006/0053380 A1 | 3/2006 | Spataro et al. |

(56) References Cited

U.S. PATENT DOCUMENTS

| | | |
|---|---|---|
| 2006/0070083 A1 | 3/2006 | Brunswig et al. |
| 2006/0075071 A1 | 4/2006 | Gillette |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0038934 A1 | 2/2007 | Fellman |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0070495 A1* | 3/2008 | Stricklen ............... H04W 8/22 455/3.01 |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |

(56) References Cited

U.S. PATENT DOCUMENTS

| | | |
|---|---|---|
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0110005 A1 | 5/2012 | Kuo et al. |
| 2012/0110436 A1 | 5/2012 | Adler, III et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0129503 A1* | 5/2012 | Lindeman ............. H04W 4/001 455/414.1 |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0305039 A1 | 11/2013 | Gauda |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0298420 A1* | 10/2014 | Barton .................. H04L 63/10 726/4 |
| 2015/0215772 A1* | 7/2015 | Gattu ................... H04W 8/245 455/418 |

(56) References Cited

U.S. PATENT DOCUMENTS

| | | | | |
|---|---|---|---|---|
| 2015/0295757 | A1* | 10/2015 | Debate | H04W 8/22 709/220 |
| 2015/0298420 | A1* | 10/2015 | Gungner | B31F 1/07 428/172 |
| 2015/0381621 | A1* | 12/2015 | Innes | G06F 21/31 726/7 |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

International Search Report and Written Opinion for PCT/US2008/012973 dated Apr. 30, 2009, pp. 1-11.
Supplementary European Search Report European Application No. EP 08 85 8563 dated Jun. 20, 2011 pp. 1-5.
International Search Report and Written Opinion for PCT/US2011/039126 mailed on Oct. 6, 2011, pp. 1-13.
Partial International Search Report for PCT/US2011/041308 dated Feb. 27, 2012, pp. 1-2.
International Search Report and Written Opinion for PCT/US2011/056472 mailed on Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 Mailed Jul. 2, 2012, pp. 1-16.
International Search Report and Written Opinion for PCT/US2011/060875 Mailed Oct. 30, 2012, pp. 1-10.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
"Understanding Metadata," National Information Standards Organization, NISO Press, 2004, 20 pages.
International Search Report and Written Opinion for PCT/US2012/056955, Applicant: Box, Inc., Mailed Mar. 27, 2013, pp. 1-11.
International Search Report and Written Opinion for PCT/US2011/047530, Applicant: Box, Inc., Mailed Mar. 22, 2013, pp. 1-10.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2011/057938, Applicant: Box, Inc., Mailed Mar. 29, 2013, 10 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
International Search Report and Written Opinion for PCT/US2012/070366, Applicant: Box, Inc., Mailed Apr. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 11 pages.
International Search Report and Written Opinion for PCT/US2013/039782, Applicant: Box, Inc., Mailed Aug. 28, 2013, 15 pages.
Exam Report for GB1313559.5, Applicant: Box, Inc., Mailed Aug. 22, 2013, 19 pages.
Exam Report for GB1310666.1, Applicant: Box, Inc. Mailed Aug. 30, 2013, 10 pages.
Google Docs, http://web.Archive.org/web/20100413105758/http://en.wikipedia.org/wiki/Google_docs, Apr. 13, 2010, 6 pages.
Exam Report for GB1316533.7, Applicant: Box, Inc. Mailed Oct. 8, 2013, 9 pages.
Exam Report for GB1309209.3, Applicant: Box, Inc. Mailed Oct. 30, 2013, 11 pages.
"Quickoffice Enhances Android Mobile office Application for Improved Productivity on latest Smartphone and Table Devices," QuickOffice Press Release, Nov. 21, 2011, QuickOffice Inc., 2 pages.
"PaperPort," Wikipedia article (old revision), published May 19, 2012, Wikipedia Foundation, 2 pages.
"PaperPort Professional 14," PC Mag. Com review, published Feb. 2012, Ziff Davis, Inc., 8 pages.

(56) References Cited

OTHER PUBLICATIONS

"QuickOffice," Wikipedia Article (old revision), published May 9, 2012, Wikipedia Foundation, 2 pages.
Exam Report for GB1316532.9, Applicant: Box, Inc. Mailed Oct. 31, 2013, 10 pages.
Gedymin, "Cloud computing with an emphasis on Google App Engine," Master Final Project, Sep. 2011, 146 pages.
Exam Report for GB1317600.3, Applicant: Box, Inc. Mailed Nov. 21, 2013, 8 pages.
Exam Report for EP13168784.0, Applicant: Box, Inc. Mailed Nov. 21, 2013, 7 pages.
Exam Report for GB1316971.9, Applicant: Box, Inc. Mailed Nov. 26, 2013, 10 pages.
Exam Report for GB1312095.1, Applicant: Box, Inc. Mailed Dec. 12, 2013, 7 pages.
Exam Report for GB1318373.6, Applicant: Box, Inc. Mailed Dec. 17, 2013, 4 pages.
Exam Report for GB1312874.9, Applicant: Box, Inc. Mailed Dec. 20, 2013, 11 pages.
Exam Report for GB1320902.8, Applicant: Box, Inc. Mailed Dec. 20, 2013, 6 pages.
Patent Court Document of Approved Judgment for GB0602349.3 and GB0623571.7; Mar. 3, 2009, 17 pages.
Exam Report for GB1311417.8, Applicant: Box, Inc. Mailed Dec. 23, 2013, 5 pages.
International Search Report and Written Opinion for PCT/US2013/034765, Applicant: Box, Inc., Mailed Jan. 20, 2014, 15 pages.
Exam Report for EP13185269.1, Applicant: Box, Inc. Mailed Jan. 28, 7 pages.
Exam Report for GB1314771.5, Applicant: Box, Inc. Mailed Feb. 17, 2014, 7 pages.
Exam Report for GB1308842.2, Applicant: Box, Inc. Mailed Mar. 10, 2014, 4 pages.
Burns, "Developing Secure Mobile Applications for Android," Oct. 2008, Version 1.0, 1-28 pages.
Search Report for EP 11729851.3, Applicant: Box, Inc. Mailed Feb. 7, 2014, 9 pages.
Comes, "MediaXchange User's Manual," Version 1.15.15, Feb. 1, 2009, pp. 1-90.
"Average Conversion Time for a D60 RAW file?" http://www.dpreview.com, Jul. 22, 2002, 4 pages.
Exam Report for GB1312264.3, Applicant: Box, Inc. Mailed Mar. 24, 2014, 7 pages.
Search Report for EP14153783.7, Applicant: Box, Inc. Mailed Apr. 7, 2014, 6 pages.
John et al., "Always Sync Support Forums—View topic—Allway sync funny behavior," Allway Sync Support Forum at http://sync-center.com, Mar. 28, 2011, XP055109680, 2 pages.
Search Report for EP14151588.2, Applicant: Box, Inc. Mailed Apr. 15, 2014, 12 pages.
Search Report for EP13187217.8, Applicant: Box, Inc. Mailed Apr. 15, 2014, 12 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Sommerer, "Presentable Document Format: Improved On-demand PDF to HTML Conversion," retrieved from the internet, http://research.microsoft.com, Nov. 2004, 8 pages.
"Tulsa TechFest 2012—Agenda," retrieved from the website, http://web.archive.org, Oct. 2, 2012, 2 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Cohen, "Debating the Definition of Cloud Computing Platforms," retrieved from the internet, http://forbes.com, Feb. 3, 2014, 7 pages.
Partial Search Report for EP131832800, Applicant: Box, Inc. Mailed May 8, 2014, 5 pages.
Search Report for EP141509422, Applicant: Box, Inc. Mailed May 8, 2014, 7 pages.
Tulloch et al., "Windows Vista Resource Kit," Apr. 8, 2007, Microsoft Press, XP055113067, 6 pages.
"Revolving sync conflicts; frequently asked questions," Microsoft Tech Support, Jul. 16, 2012, retrieved from the Internet: http://web.archive.org/web, 2 pages.
Pyle et al., "How to enable Event logging for Offline Files (Client Side Caching) in Windows Vista," Feb. 18, 2009, retrieved from the internet: http://blogs.technet.com, 3 pages.
Duffy, "The Best File-Syncing Services," pcmag.com, retrieved from the internet: http://www.pcmag.com, Sep. 28, 2012, 7 pages.
"Troubleshoot sync problems," Microsoft Tech Support: May 2, 2012, retrieved from the internet, http://web. Archive.org/web, 3 pages.
Exam Report for GB1318792.7, Applicant: Box, Inc. Mailed May 22, 2014, 2 pages.
Exam Report for EP13177108.1, Applicant: Box, Inc. Mailed May 26, 2014, 6 pages.
Exam Report for GB1410569.6 Applicant: Box, Inc. Mailed Jul. 11, 2014, 9 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
"How-to Geek, How to Sync Specific Folders With Dropbox," originally written on Jun. 1, 2010 and archived version retrieved from WaybackMachine as published online on Jul. 4, 2014 at http://www.howtogeek.com/howto/18285/sync-specific-folders-with-dropbox, 5 pages.

\* cited by examiner

ENTERPRISE MOBILITY MANAGEMENT AND VERIFICATION OF A MANAGED APPLICATION BY A CONTENT PROVIDER

CROSS-REFERENCE TO RELATED APPLICATIONS

This application claims priority to and benefit from U.S. Provisional Patent Application Ser. No. 62/012,894 titled "MOBILE DEVICE MANAGEMENT AND POSTURE CHECKING BY A CLOUD-BASED SERVICE FOR AN ENTERPRISE" filed on Jun. 16, 2014 which is expressly incorporated by reference herein.

BACKGROUND

Mobile device management (MDM) is an industry term describing the administration of mobile devices, such as smartphones, tablet computers, laptops and desktop computers. The use of MDM allows an enterprise to provide employees, contractors, etc., with access to internal networks via the mobile devices of their choosing.

MDM is typically implemented and maintained by an MDM provider which controls and protects the data and configuration settings for the mobile devices in the network. For example, MDM can be implemented and maintained by an MDM provider for an enterprise client with the use of a third party product such as, for example, a third-party application ("app"). In such cases, the MDM providers typically provide a standard development kit (SDK) for MDM development/integration into the third-party app. Unfortunately, this requires third-party application developers (or content providers) to create and maintain various versions of their applications for each MDM provider. Maintenance of the various versions can quickly become unmanageable.

Overall, the examples herein of some prior or related systems and their associated limitations are intended to be illustrative and not exclusive. Upon reading the following, other limitations of existing or prior systems will become apparent to those of skill in the art.

BRIEF DESCRIPTION OF DRAWINGS

The present embodiments are illustrated by way of example and are not intended to be limited by the figures of the accompanying drawings.

The same reference numbers and any acronyms identify elements or acts with the same or similar structure or functionality throughout the drawings and specification for ease of understanding and convenience.

DETAILED DESCRIPTION

Figure 1:
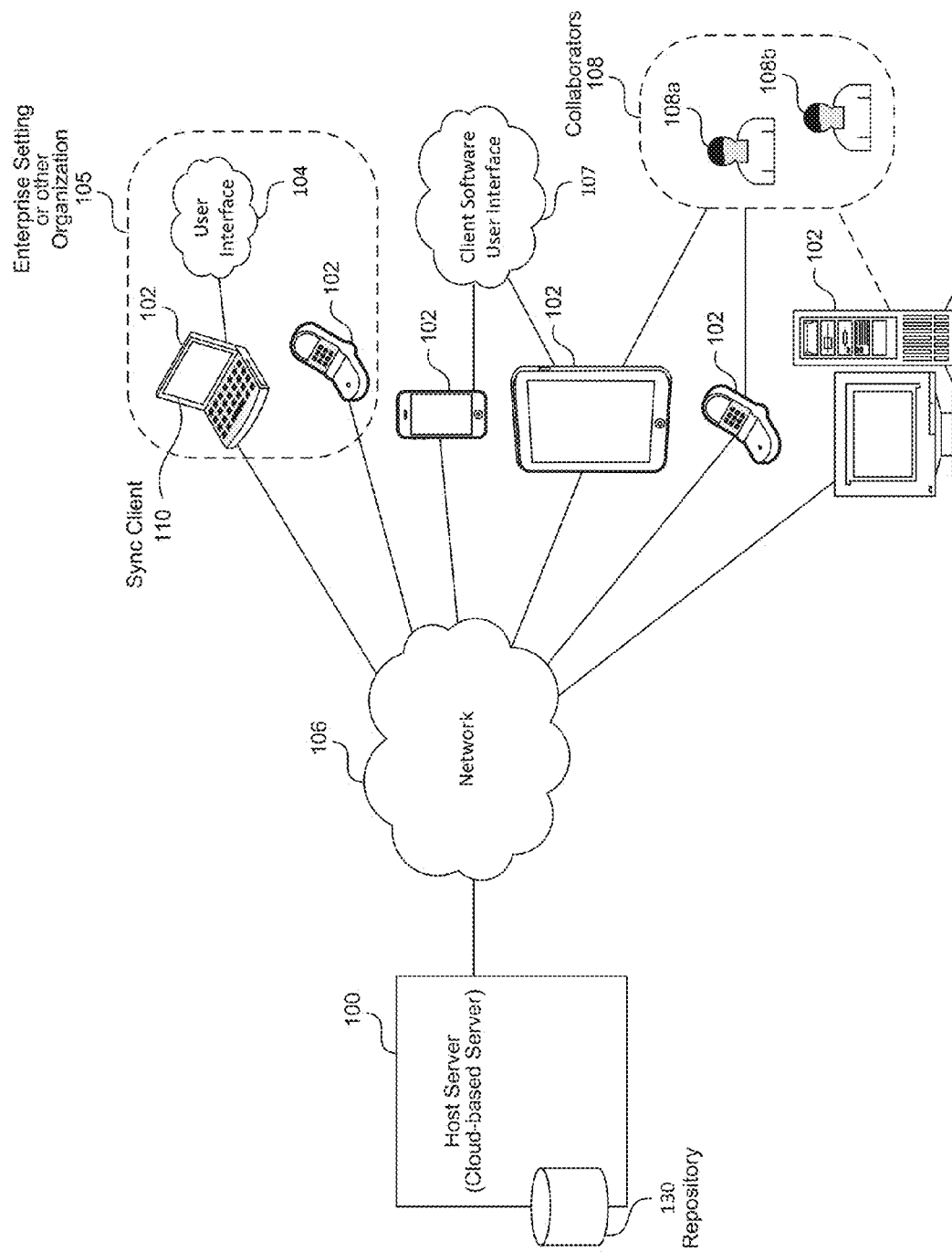
FIG. 1 depicts an example diagram of a system having a host server of a cloud-based service, collaboration and/or cloud storage accounts with capabilities that enable synchronization of items (e.g., files or folders) with permissions imposed by enterprise administrators ("admins") or enterprise content item owners in a cloud-based environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms can be highlighted, for example, using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

As discussed above, third-party application developers currently have to create and maintain various versions of their applications for each MDM provider which can be unmanageable. A scalable methodology is described herein.

A non-SDK based scalable technology for integrating multiple mobile device management (MDM) service providers into a content provider platform (or server) is described herein. More specifically, the technology described herein facilitates enterprise mobility management through verification of a managed application associated with an enterprise via the content provider platform. In some embodiments, the content provider platform comprises a cloud-based collaboration and/or storage environment ("cloud-based platform server") that prevents an unmanaged application from gaining access to the cloud-based collaboration and/or storage server.

FIG. 1 depicts an example diagram of a system having a host server 100 of a cloud-based service, collaboration and/or cloud storage accounts with capabilities that enable synchronization of items (e.g., files or folders) with permissions imposed by enterprise admins or enterprise content item owners in a cloud-based environment. In some embodiments, a synchronization (sync) server (not shown) can support synchronization of folders and/or files stored locally on a user's computer with folders stored by the host server 100 in repository 130.

The client devices 102 can be any system and/or device, and/or any combination of devices/systems that is able to establish a connection, including wired, wireless, cellular connections with another device, a server and/or other systems such as host server 100. Client devices 102 typically include a display and/or other output functionalities to present information and data exchanged between/among the devices 102, and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand-held console, a hand-held gaming device or console (e.g., XBOX live, Nintendo DS, Sony PlayStation Portable, etc.), iOS powered watch, Google Glass, a Chromebook and/or any other portable, mobile, hand-held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, and host server 100 are coupled via a network 106. In some embodiments, the devices 102 and host server 100 can be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 100). The collaboration environment or platform can have one or more collective settings 105 for an enterprise or an organization that the users belong, and can provide an user interface 104 (e.g., via a webpage application (or a "web application") accessible by the web browsers of devices 102) for the users to access such platform under the settings 105. Additionally or alternatively, a client software 110 ("sync client") that is native to the cloud collaboration platform can be provided (e.g., through downloading from the host server 100 via the network 106) to run on the client devices 102 to provide cloud-based platform access functionalities. The users and/or collaborators can access the collaboration platform via a client software user interface 104, which can be provided by the execution of the client software on the devices 102.

The collaboration platform or environment hosts workspaces with work items that one or more users can access (e.g., view, edit, update, revise, comment, download, preview, tag, or otherwise manipulate). A work item can generally include any type of digital or electronic content that can be viewed or accessed via an electronic device (e.g., device 102). The digital content can include .pdf files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user can be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace can be the same or can vary among the users. Each user can have their own set of access rights to every piece of content in the workspace, or each user can have different access rights to different pieces of content. Access rights can be specified by a user associated with a workspace and/or a user who created/uploaded a particular piece of content to the workspace, or any other designated user or collaborator.

In general, the collaboration platform allows multiple users or collaborators to access or collaborate efforts on work items such that each user can remotely view edits, revisions, comments, or annotations being made to specific work items through their own user devices. For example, a user can upload a document to a workspace for other users to access (e.g., for viewing, editing, commenting, signing-off or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 100 communicate, can be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and can appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL) or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

In some embodiments, the host server 100 and/or the sync client 110 enables enterprise admins and/or content owners to selectively impose permissions on synced files and folders on client devices. The permissions on the sync items can prevent a user from taking certain actions on those items once they are downloaded to the user's client device from the host server. In some embodiments, even if the user takes certain actions on the sync items that are not permitted, the sync client 110 and/or the host server 100 can detect the changes that are inconsistent with or not permitted and reject those changes. The sync client 110 can also undo or repair the changes on the sync items. All of these actions ensure a one way flow of content from the host server 100 to the client device. This has the advantage of providing the most up to date content to users, with the host server 100 as the authoritative source of content. In some embodiments, by handling changes made locally that are not permitted or inconsistent with the permission settings, the sync client 110 can restore the changed files to their original form, without losing any local work and while reducing the amount of data transmitted back and forth between the client device and the host server 100.

Figure 2:
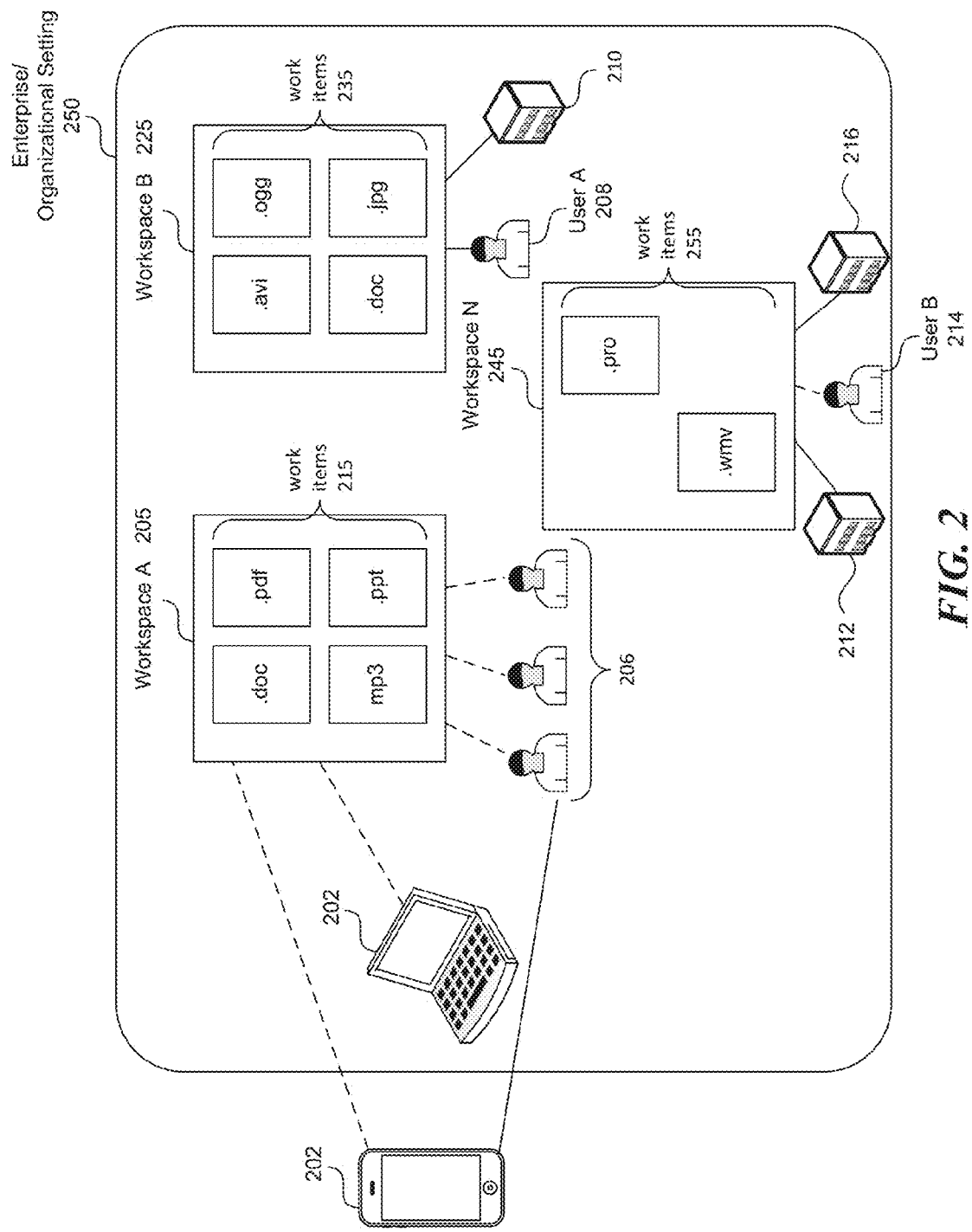
FIG. 2 depicts an example diagram of a web-based or online collaboration platform deployed in an enterprise or other organizational setting for organizing work items and workspaces.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access will depend on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, and/or creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3:
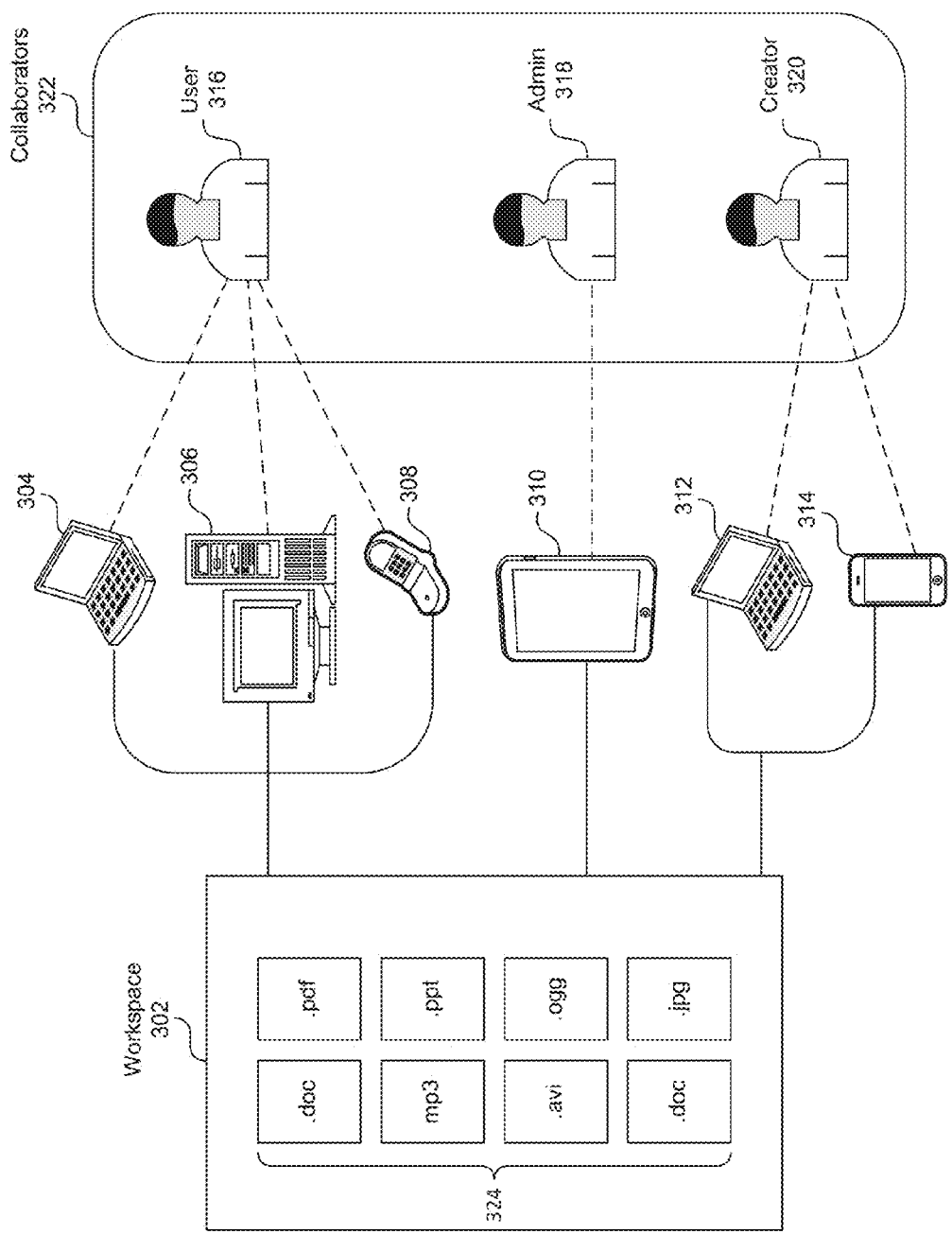
FIG. 3 depicts an example diagram of a workspace in an online or web-based collaboration environment accessible by multiple collaborators through various devices.

FIG. 3 depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example, users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of or all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream, among other notifications, through a user interface on the user device according to relevancy to the user based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events, such as tasks, can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Figure 4A:
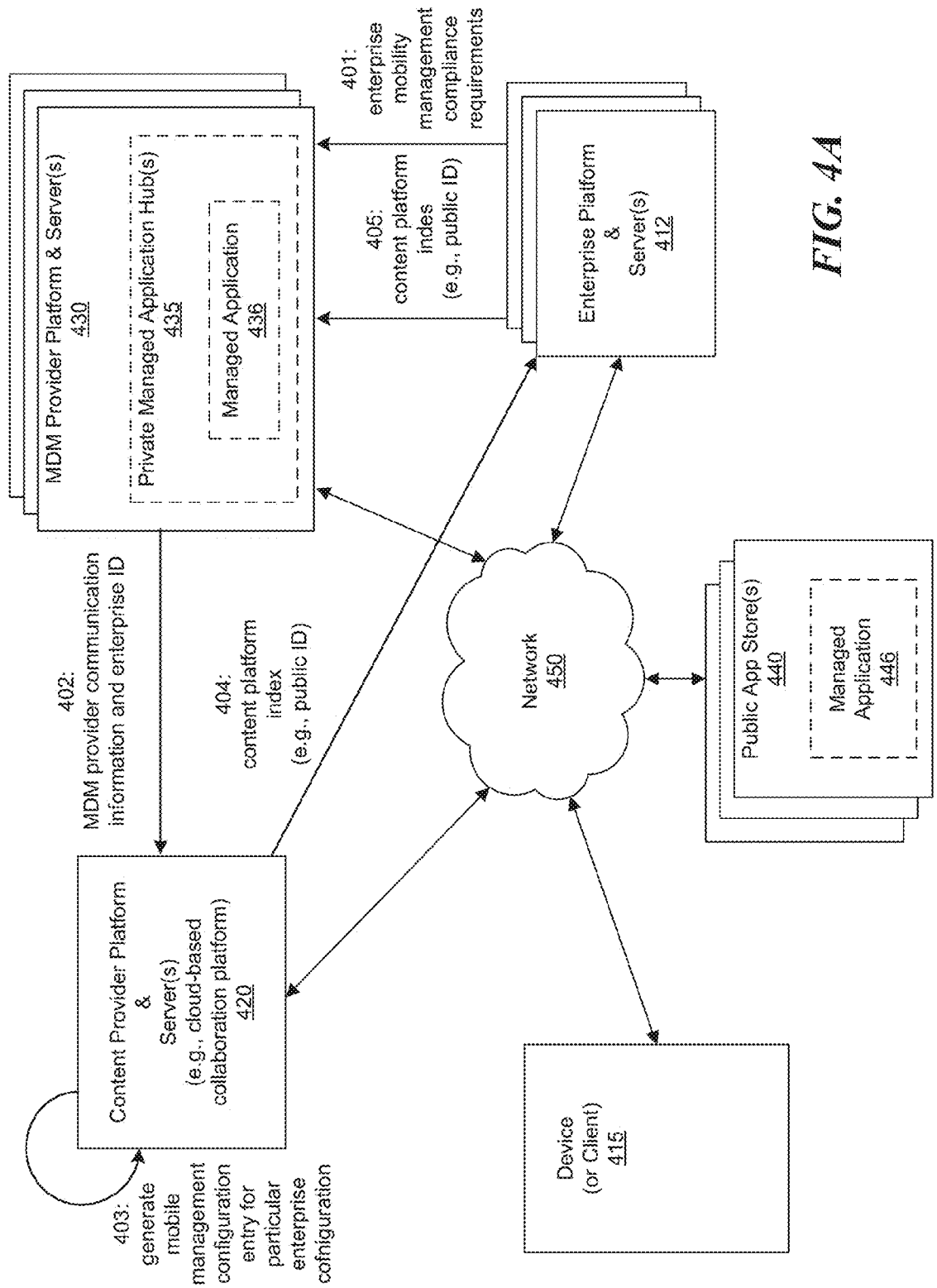
FIGS. 4A and 4B depict data flow diagrams illustrating an example operation of components in a cloud-based environment for facilitating mobile device management and verification checking for enterprise mobility management, according to an embodiment.
Figure 4B:
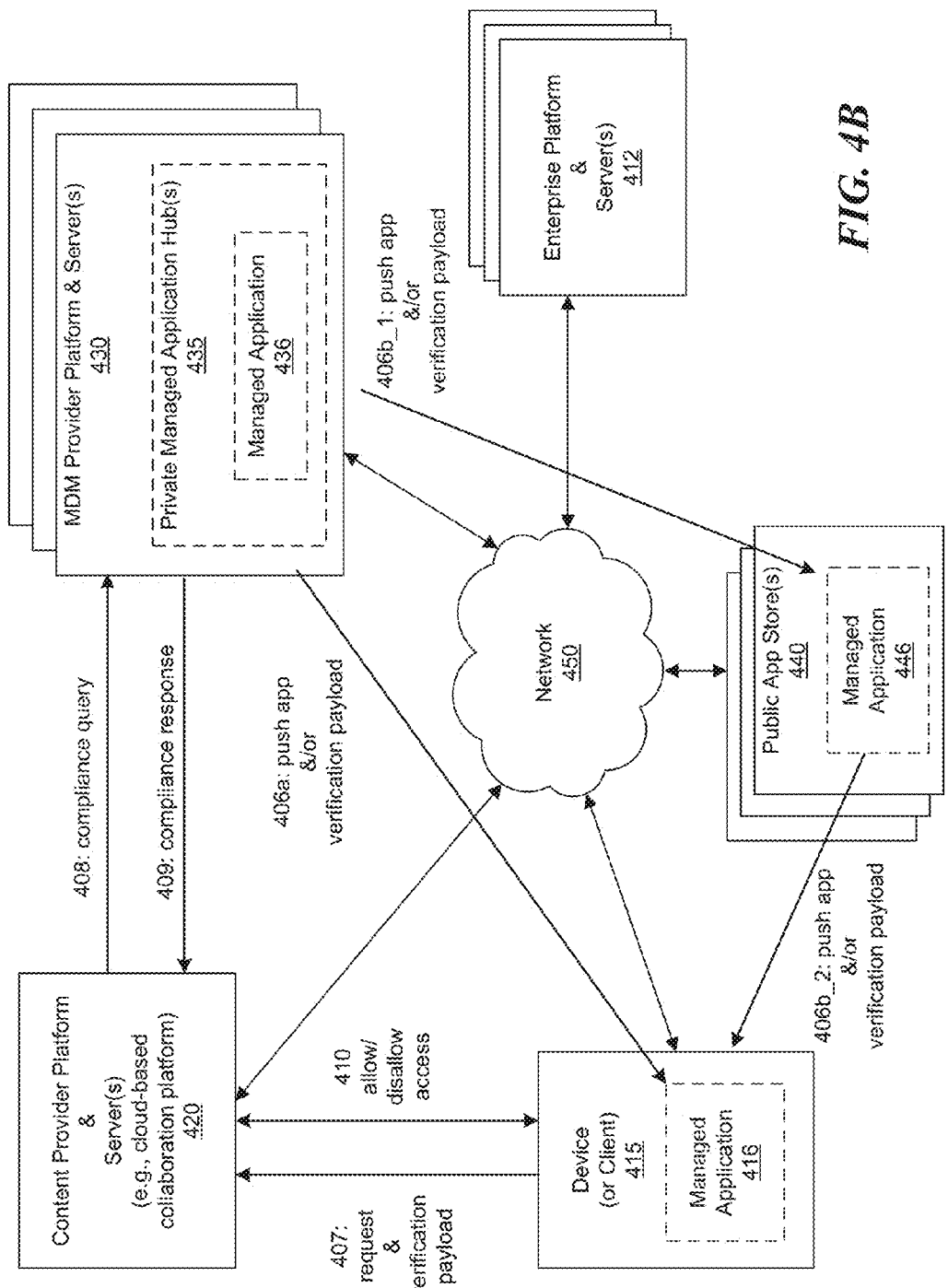

FIGS. 4A and 4B depict data flow diagrams illustrating example operation of components in a cloud-based environment 400 for facilitating mobile device management and verification checking for enterprise mobility management, according to an embodiment. More specifically, the examples of FIGS. 4A and 4B illustrate a cloud-based content platform configured to generate and initialize a mobile management configuration entry for a particular enterprise configuration and verify a managed application associated with an enterprise using the mobile management configuration entry, respectively.

As shown in the examples of FIGS. 4A and 4B, the cloud-based environment 400 includes one or more enterprise(s) platform 412, a device (or client) 415, a content provider platform 420, one or more MDM provider platforms 430, one or more public application or app store(s) 440, and a network 450. Each MDM provider platforms 430 can include a private managed application hub 435 from which the managed application 436 can be presented and/or otherwise made available for download to the device (or client) 415. Network 450 can be network 106 of FIG. 1, although alternative configurations are possible.

Referring first to FIG. 4A, information exchanged between the enterprise platform 412, the MDM provider platform 430 and the content provider platform 420 can be communicated in any number of ways including server-to-server, human-to-server, server-to-human, and/or combinations or variations thereof. To begin, at step 401, the enterprise platform 412 (or enterprise representative) provides enterprise mobility management compliance requirements to an MDM provider platform 430. The enterprise mobility management compliance requirements can be transferred between representatives of the respective organizations, entered directly into a database by an MDM representative, entered directly into a database by an enterprise representative, etc.

At step 402, the MDM provider platform 430 provides MDM provider communication information and an enterprise ID to the content provider platform. Similar to the enterprise compliance requirements, the MDM provider communication information and an enterprise ID can be provided to the content provider platform 420 in any number of ways including server-to-server, human-to-server, and/or server-to-human. The MDM provider communication information can include a variety of information for establishing communications with the particular MDM provider platform such as, for example, a server address, authentication information, API information, etc., for the particular MDM provider. The enterprise ID can identify a particular enterprise for which the mobile management configuration entry is to be created. Various MDM provider communication information is shown and discussed in greater detail with reference to FIG. 5C.

The content provider platform 420 receives the MDM provider/enterprise information and, at step 403, generates a mobile management configuration entry associated with the enterprise. In some embodiments, the mobile management configuration entry is stored in a database, e.g., mobility management configuration database 525 of FIGS. 5A and 5B and made accessible via in the database via a content platform index. The content platform index can be any identifier that uniquely identifies the mobile management configuration entry in the database, e.g., a public identifier (ID). Once the mobile management configuration entry is generated, at step 404, the content provider platform provides the content platform index to the enterprise platform 412 which, in turn, provides the content platform index to the MDM provider platform 430.

Referring next to FIG. 4B, in some embodiments, the MDM provider platform 430 can present and/or otherwise make a managed application available to a device (or client) 415. For example, as shown in the examples of FIGS. 4A and 4B, the MDM provider platform 430 includes a private managed application hub 435 from which the managed application 436 can be presented and/or otherwise made available for download to the device (or client) 415.

Initially, the managed application 436 is pushed and/or otherwise downloaded to the device (or client) 415. This process can occur in a number of ways. For example, at step 406a, the MDM provider platform 430 pushes a managed application 416 and/or a verification payload to the device (or client) 415. As described herein, the verification payload includes at least a content platform index, e.g., public ID, and an MDM specific ID, e.g., management ID. Alternatively or additionally, at steps 406b_1 and 406b_2, the MDM provider platform 430 pushes the managed application and/or the verification payload to the device (or client) 415 via a public app store 440. The managed application can be pushed from the MDM provider platform 430 responsive to a request initiated by a user of the device 415 or at the direction of the MDM provider platform 430.

Once downloaded and installed on the device (or client) 415, the managed application 416 can be executed by a user of the device attempting to access content on the content provider platform 420. At step 407, the managed application 416 can generate and issue a request including the verification payload. As previously discussed, the verification payload can include a content platform index, e.g., public ID, and an MDM specific ID, e.g., management ID. The request can be an authentication request or a verification request. An authentication request is typically initiated by an unauthenticated user who is attempting to access the content provider 420 via the managed application 416. Thus, the authentication request includes user credentials, e.g., username and password combination, and occurs when the user/managed application 416 is not yet logged into the content provider platform 420. Conversely, a verification request can be initiated periodically, based on some event, etc., by the managed application 416 after authentication has occurred. Triggering of the verification request by the managed application 416 can be configurable.

As discussed in greater detail with reference to FIGS. 5A and 5B, the content provider platform 420 processes the request and performs a verification check on the managed application 416 using the mobile management configuration entry. For example, the content provider platform 420 can process the verification payload to extract the content platform index and the MDM specific ID. As discussed, the content platform index can identify a particular mobile management configuration entry on the content server. The content provider platform 420 accesses the particular mobile management entry using the content platform index and processes the entry to identify an enterprise and MDM provider communication information.

In some embodiments, the content provider platform 420 verifies that the user belongs to the enterprise. For example, an authentication request includes user credentials, e.g., username and password combination, that can be used to identify a corresponding enterprise. The content provider platform 420 can verify that the user belongs to the enterprise by cross-referencing an enterprise indicated by received user credentials with the enterprise indicated by the mobile management configuration entry. The content provider platform 420 will disallow the managed application 416 from accessing the content server if the enterprise, indicated by the user credentials, does not match the enterprise indicated by the mobile management entry.

At step 408, the content provider platform 420 generates and sends a compliance query to the MDM provider platform 430 to verify that the managed application 416 associated with the enterprise is in compliance with the established enterprise mobility management compliance requirements. As discussed, the content provider platform 420 uses the MDM-specific communication information to generate the MDM specific compliance query for the MDM provider platform 430. The MDM information can include MDM-specific communication information such as API information, server address information, authentication information, etc. The compliance query includes the MDM specific ID, e.g., management ID which is specific to the MDM provider. The management ID is not processed by the content provider platform 420 but can include, for example, any information to identify a specific managed user, a specific managed device, a combination thereof, etc.

The MDM provider platform 430 receives the compliance query including the MDM, verifies that the user/device indicated by the MDM specific ID is in compliance and, at step 409, provides a compliance response to the content provider platform 420. The compliance response indicates whether or not the enterprise mobility management compliance requirements are satisfied. The content provider platform 420 receives the compliance response and, at step 410, responsively allows the managed application to access the content server if the enterprise mobility management compliance requirements are satisfied. As discussed in more detail below, access will be disallowed and, optionally, a notification may be sent and/or action (e.g., wipe) may be performed if the enterprise mobility management compliance requirements are not satisfied.

Figure 5A:
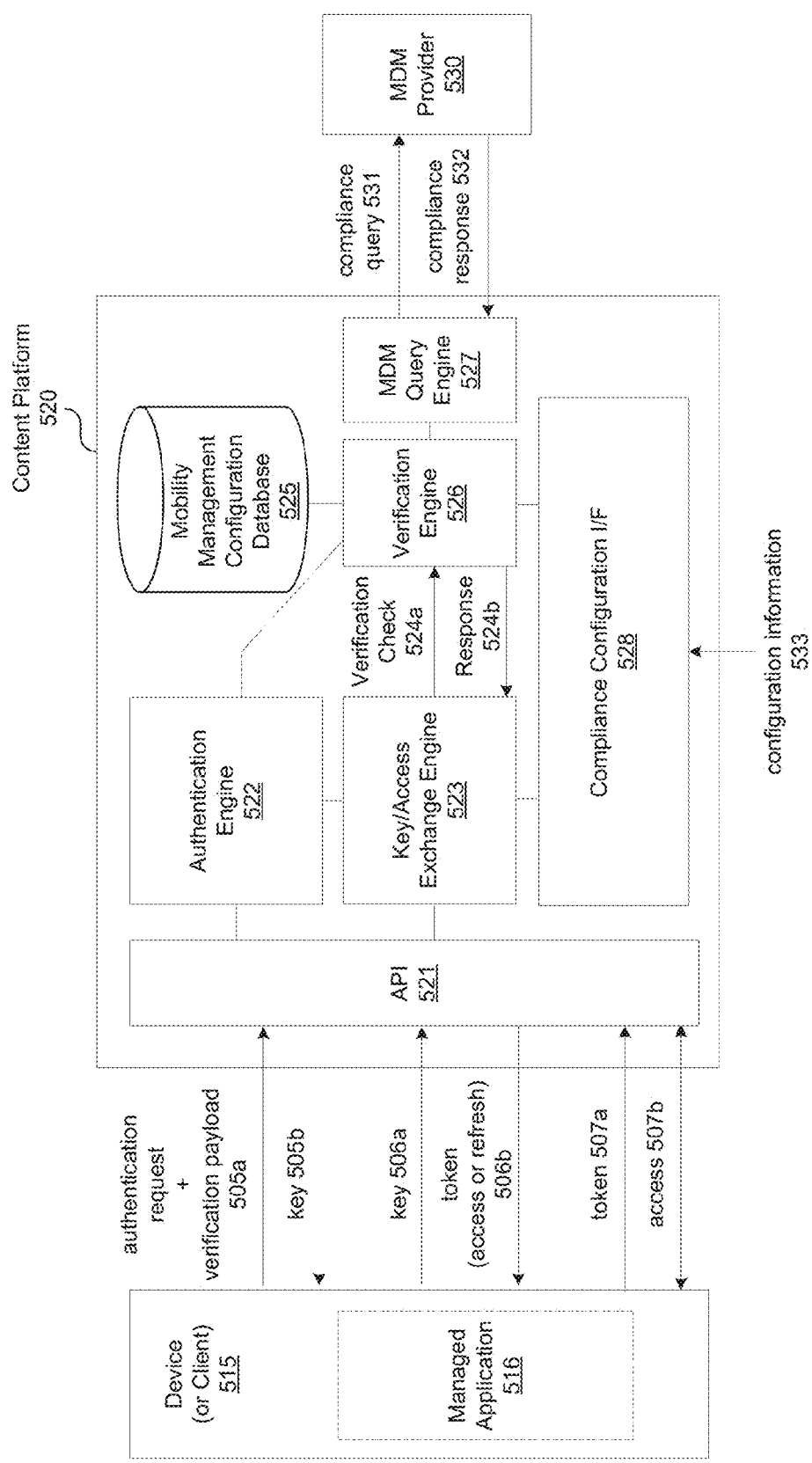
FIGS. 5A and 5B depict data flow diagrams illustrating example operation of components in a cloud-based environment for facilitating mobile device management and verification checking for enterprise mobility management, according to some embodiments.
Figure 5B:
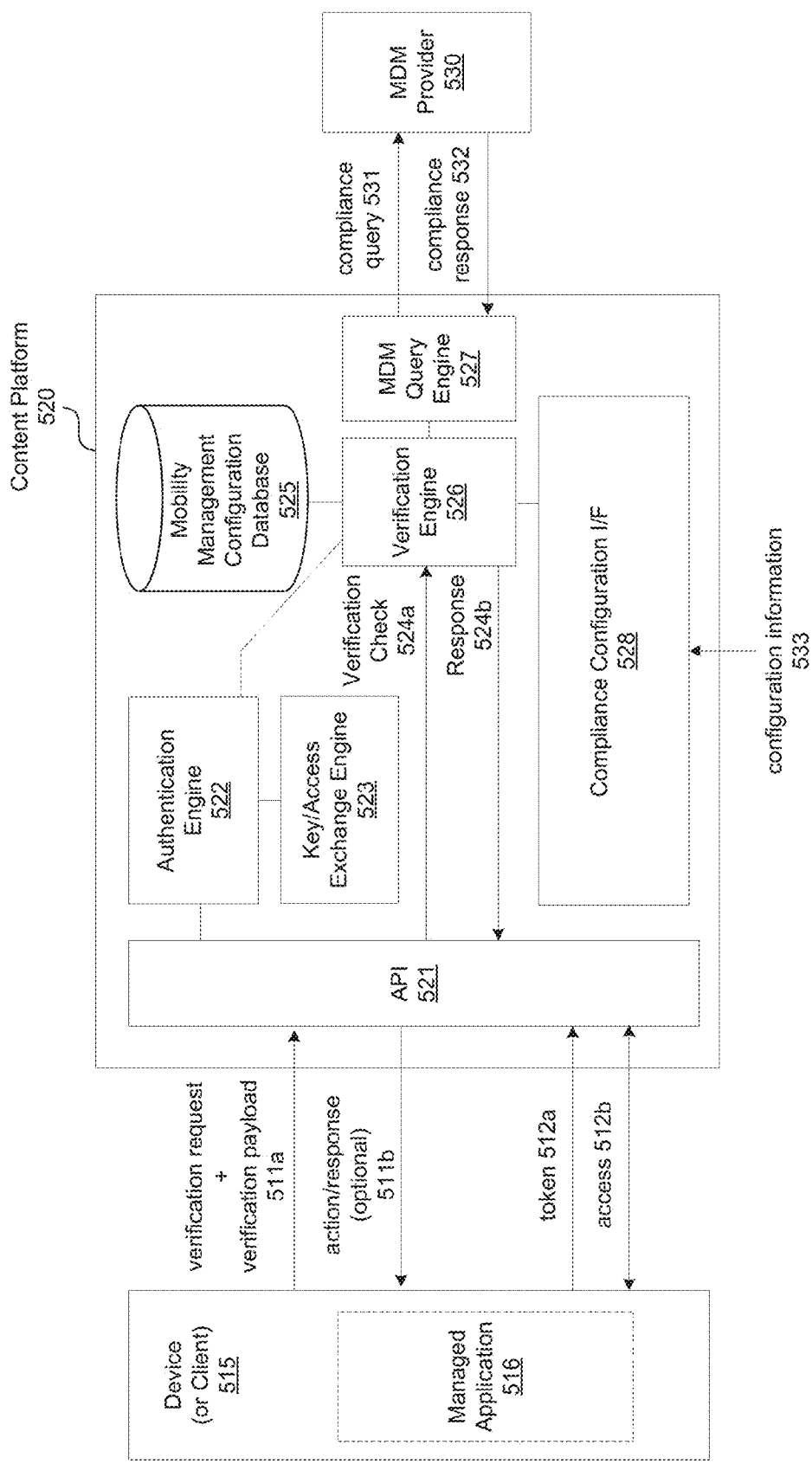

FIGS. 5A and 5B depict data flow diagrams illustrating an example operation of components in a cloud-based environment 500 for facilitating mobile device management and verification checking for enterprise mobility management, according to some embodiments. More specifically, the examples of FIGS. 5A and 5B illustrate operation of a cloud-based content platform 520 configured to verify a managed application 516 associated with an enterprise in response to reception of an authentication request and a verification request, respectively.

As shown in the examples of FIGS. 5A and 5B, the content platform 520 includes an application program interface (API) 521, an authentication engine 522, a key/access exchange engine 523, a mobility management configuration database 525, a verification engine 526, an MDM query engine 527, and a compliance configuration interface 528. Additional or few components/modules/engines are possible.

FIG. 5A illustrates operation of a cloud-based content platform 520 configured to verify a managed application 516 associated with an enterprise (not shown) in response to reception of an authentication request. The authentication request 505a includes user credentials, e.g., username and password combination, and a verification payload.

At step 505a, the API 521 is configured to receive the authentication request 505a including the user credentials and verification payload. In some embodiments, the verification payload can include multiple key-value pairs. For example, a first portion of the verification payload can include, among other values, a content platform index, e.g., public ID, and the second portion of the verification payload can include, among other values, an MDM specific ID, e.g., management ID. The content platform index can uniquely identify a configuration entry in a mobility management configuration database. The MDM specific ID is typically set by a corresponding MDM provider and can, for example, uniquely identify a managed device, a managed user, and/or managed application, etc.

API 521 is configured to provide managed applications executing on devices or clients with an interface to functionality of the content platform including access to the content contained thereon and access to verification checks. API 521 provides the authentication request and user credentials to authentication engine 522.

The authentication engine 522 is configured to receive the authentication request and user credentials and responsively attempts to authenticate the user with the content platform using the user credentials. If the authentication is successful, at 505b, a key is sent for delivery to the device (or client) 515. At step 506a, the device (or client) 515 provides the key in exchange for an access token (or refresh token). The key is passed to the key/access exchange engine 523 which is configured to kick off and/or otherwise initiate a verification check 524a. Alternatively or additionally, the authentication engine 522 can kick off the verification check 524a.

The verification engine 526 is configured to perform the verification check procedures described herein. Specifically, the verification engine 526 is configured to extract the content platform index and the MDM specific ID from the verification payload. The content platform index is then used to access a pre-established mobile management configuration entry in the mobility management configuration database 525. The verification engine 526 then processes the pre-established mobile management configuration entry to identify an enterprise and MDM provider communication information corresponding to the enterprise.

In some embodiments, a two-part verification procedure is performed by the content platform 520. First, the verification engine 526 verifies that the user initiating the authentication request belongs to the enterprise. For example, an authentication request includes user credentials, e.g., username and password combination, that can be used to identify a corresponding enterprise. The verification engine 526 is configured to verify that the user belongs to the enterprise by cross-referencing an enterprise indicated by received user credentials with the enterprise indicated by the mobile management configuration entry. The verification engine 526 notifies the key/access exchange engine 523 if the enterprise indicated by the user credentials does not match the enterprise indicated by the mobile management entry. The key/access exchange engine 523 will responsively disallow the managed application 416 from accessing the content server if the enterprise indicated by the user credentials does not match the enterprise indicated by the mobile management entry.

In a second part of the two-part verification procedure, the verification engine 526 provides the MDM specific ID and the identified MDM provider communication information corresponding to the enterprise to the MDM query engine 527. As discussed above, the MDM provider communication information can include a variety of information for establishing communications with the particular MDM provider platform such as, for example, a server address, authentication information, API information, etc., for the particular MDM provider.

The MDM query engine 527 is configured to generate a compliance query 531 based on the MDM provider communication information which includes the MDM specific ID. The compliance query 531 is sent for delivery to the MDM provider 530. The MDM provider 530 verifies that managed application 516 is in compliance with the established enterprise mobility management compliance requirements and responsively sends a compliance response 532.

One or more components of the content platform 529 receive and process the compliance response 532 and generate a verification response 524b. The verification response 524b indicates whether or not the managed application 516 is in compliance with the established enterprise mobility management compliance requirements. The key/access exchange engine 523 processes the response to either allow the managed application 516 access to the content platform if compliant or disallow access to the content platform if non-compliant.

The MDM provider platform 430 receives the compliance query including the MDM, verifies that the user/device indicated by the MDM specific ID is in compliance and, at step 409, provides a compliance response to the content provider platform 420. The compliance response indicates whether or not the enterprise mobility management compliance requirements are satisfied. The content provider platform 420 receives the compliance response and, at step 410, responsively allows the managed application to access the content server if the enterprise mobility management compliance requirements are satisfied. As discussed in more detail below, access will be disallowed and, optionally, a notification may be sent and/or action (e.g., wipe) may be performed if the enterprise mobility management compliance requirements are not satisfied.

Various components/engines/modules can be configurable, e.g., by an administrator of the content platform. The compliance configuration interface 528 is configured to receive this configuration information 533 and configure the components/engines/modules accordingly.

FIG. 5B illustrates operation of a cloud-based content platform 520 configured to verify a managed application 516 associated with an enterprise (not shown) in response to reception of a verification request.

The verification request 511a includes a verification payload. The optional action/response 511b can be, for example, an instruction to wipe the application or the application data if the verification response 524b indicates that the managed application 516 is not in compliance with the established enterprise mobility management compliance requirements As described above, a verification request can be initiated periodically, based on some event, etc., by a managed application 516. Triggering of the verification request 511a by the managed application 516 can be configurable by an MDM provider prior to download and/or as part of an application update. Responsive to a verification request, authentication of the user (re-authentication) is not typically required. Additionally, the verification engine 526 need not verify that the user initiating the verification request belongs to the enterprise as this check has already been performed. Rather, responsive to a verification request, only the second part of the two-part verification procedure described above is typically performed with the verification check 524a and response 524b bypassing the key/access exchange engine 523.

If, for example, the managed application 516, the device 515, or a user of the device (not shown) become unmanaged, then the verification response 524b will indicate this and the content platform 520 will cease providing access to the managed application 516 (e.g., token 512a will not be valid resulting in no access 512b). The user of the device 515 will also be logged out of the content platform 520. Furthermore, in some embodiments, an optional action/response 511b will be sent to the device 515. A response can be a notification that access is lost and the user has been logged out. Alternatively or additionally, an action can include wiping some or all of the data associated with the managed application 516 from the device 515. Other actions/responses are also possible.

Figure 5C:
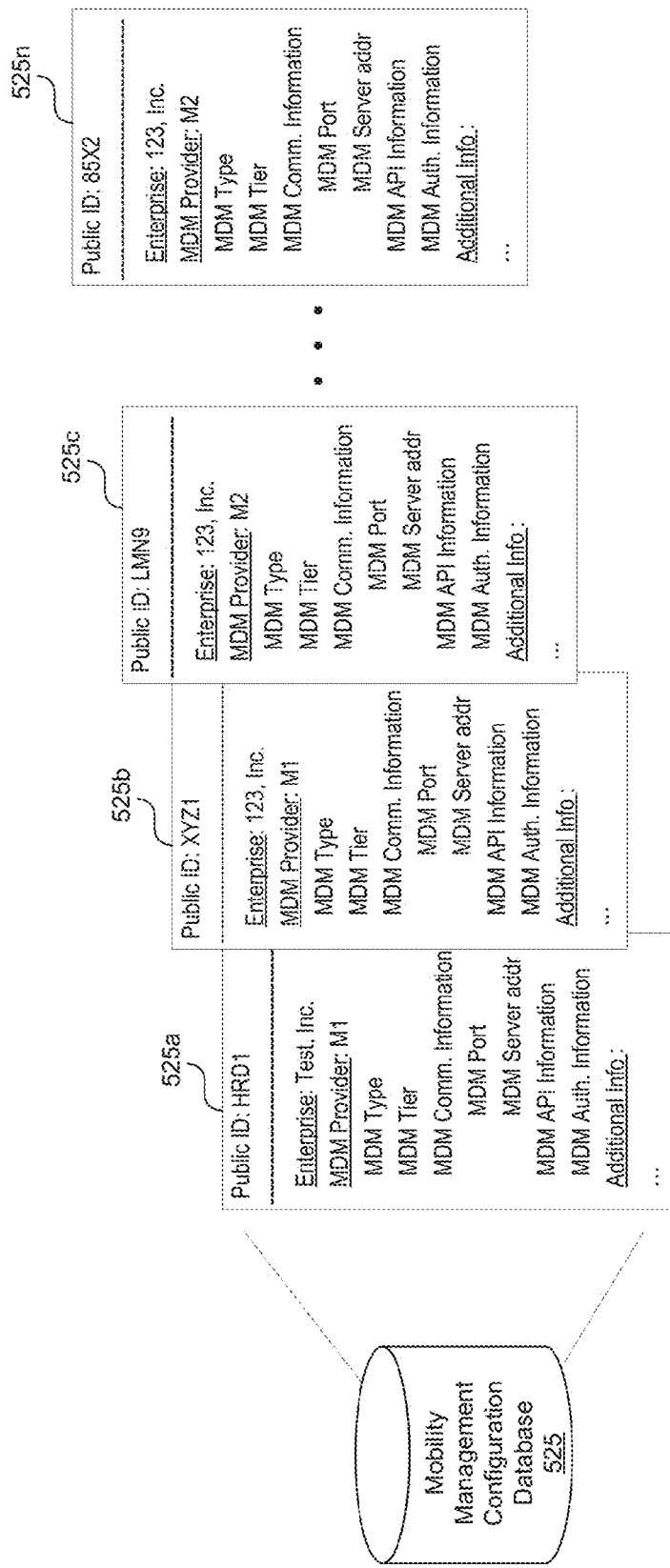
FIG. 5C illustrates example contents of a mobility management configuration database, according to an embodiment.

FIG. 5C illustrates example contents of a mobility management configuration database 525, according to an embodiment. More specifically, various example mobile management configuration entries 525a-n are shown.

As discussed herein, each mobile management configuration entry 525 is indexed or identifiable via a content platform index e.g., a public ID. The configuration entries each identify a corresponding enterprise and MDM provider communication information. By way of example and not limitation, the MDM provider communication information can include an MDM type, an MDM tier, an MDM port, an MDM server address, MDM API information, MDM authentication information, etc. Although not shown, the mobile management configuration entries 525a-n can include additional MDM information.

Figure 6A:
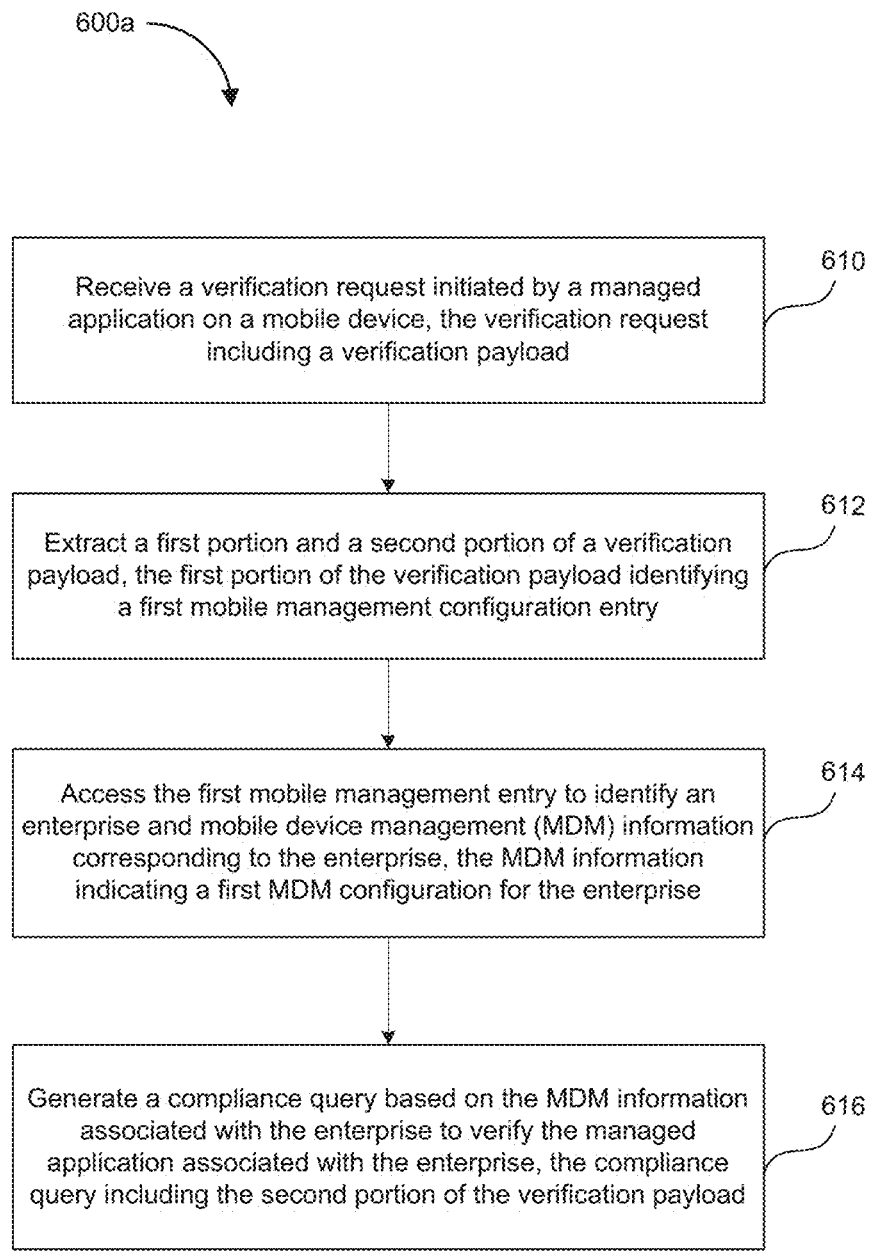
FIGS. 6A and 6B depict data flow diagrams illustrating example processes for verifying a managed application associated with an enterprise via a content platform (or server), according to various embodiments.
Figure 6B:
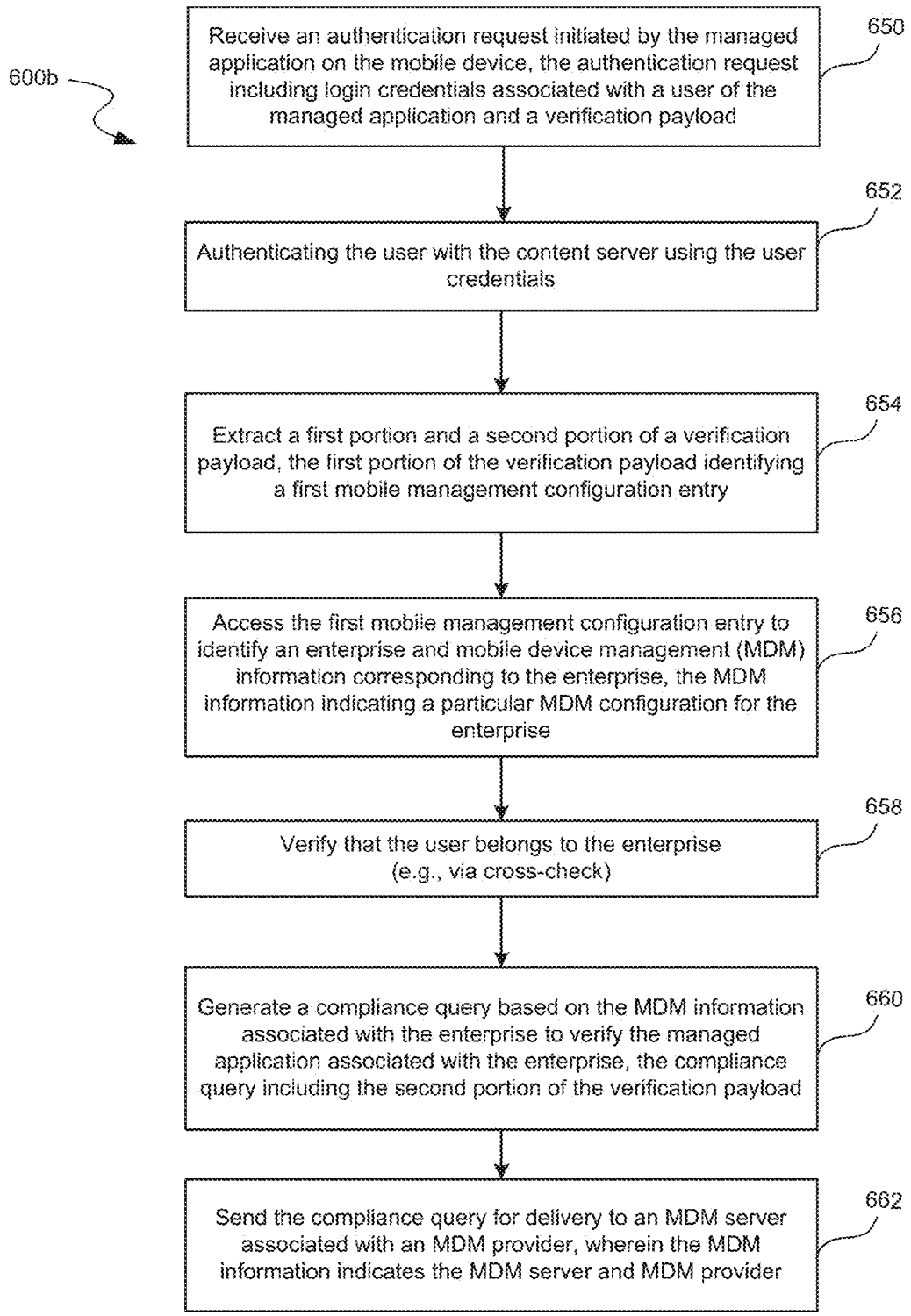

FIGS. 6A and 6B depict data flow diagrams illustrating example processes for verifying a managed application associated with an enterprise via a content platform (or server), according to various embodiments. Components and/or one or more processors of a content platform such as, for example, the content platform 520 of FIGS. 5A and 5B can, among other functions, perform the example processes of FIGS. 6A and 6B.

FIG. 6A illustrates operation of a content server for verifying a managed application associated with an enterprise in response to reception of a verification request. A verification request can be initiated by, for example, a managed application after authentication of a user of the device with the content sever.

To begin, at process 610, the content platform receives a verification request initiated by a managed application on a mobile device, the verification request including a verification payload. As described herein, a verification request can be initiated periodically, based on some event, etc., by a managed application running and/or otherwise executing on the device (or client). Furthermore, triggering of the verification request by the managed application can be configurable by an MDM provider prior to download of the application and/or as part of an application update.

The verification request includes a verification payload. At process 612, the content platform extracts a first portion and a second portion of a verification payload; the first portion of the verification payload identifying a first mobile management configuration entry. The first portion of the verification payload can include, for example, a content platform index, e.g., a public ID that indexes and/or otherwise identifies the first of multiple mobile management configuration entries in a mobility management configuration database. The configuration entries each identify a corresponding enterprise and MDM provider communication information. The MDM provider communication information can include a variety of information for establishing communications with the particular MDM provider platform such as, for example, a server address, authentication information, API information, etc., for the particular MDM provider. The enterprise ID can identify a particular enterprise for which the mobile management configuration entry is to be created.

At process 614, the content platform accesses the first mobile management entry to identify the enterprise and mobile device management (MDM) information corresponding to the enterprise. As discussed herein, the MDM information indicates a first MDM configuration for the enterprise of multiple possible MDM configurations.

Lastly, at process 616, the content platform generates a compliance query based on the MDM information associated with the enterprise to verify the managed application associated with the enterprise. The compliance query includes the second portion of the verification payload. The second portion of the verification payload can include an MDM specific ID such as, for example, a management ID. In some embodiments, the second portion of the verification payload includes additional items, e.g., key-values. That is, a variety of information can be extracted from the verification payload and included as part of the compliance query. As described herein, the MDM specific ID, e.g., management ID, is not processed by the content platform but can include, for example, any information to identify a specific managed user, a specific managed device, a specific managed application, and/or combinations or variations thereof, etc.

Referring next to FIG. 6B, which illustrates operation of a content server for verifying a managed application associated with an enterprise in response to reception of an authentication request, at process 650, the content platform receives the authentication request initiated by the managed application on the mobile device, the authentication request including login credentials associated with a user of the managed application and a verification payload. At process 652, the content platform authenticates the user with the content server using the user credentials.

At processes 654 and 656, the content platform extracts a first portion and a second portion of a verification payload and accesses the first mobile management entry to identify the enterprise and mobile device management (MDM) information corresponding to the enterprise as described above with respect to FIG. 6A. At process 658, the content platform verifies that the user belongs to the enterprise. For example, verifying that the user belongs to the enterprise can include identifying an enterprise indicated by received user credentials and cross-referencing this enterprise indicated by received user credentials with the enterprise indicated by the first mobile management configuration entry. Access to the content server can be disallowed for the managed application if the enterprise indicated by the user credentials does not match the enterprise indicated by the first mobile management configuration entry. However, if the enterprise check succeeds, at process 660, the content platform generates a compliance query based on the MDM information associated with the enterprise to verify the managed application associated with the enterprise, the compliance query including the second portion of the verification payload. Lastly, at process 662, the content platform sends the compliance query for delivery to an MDM server associated with an MDM provider, wherein the MDM information indicates the MDM server and MDM provider.

Figure 7:
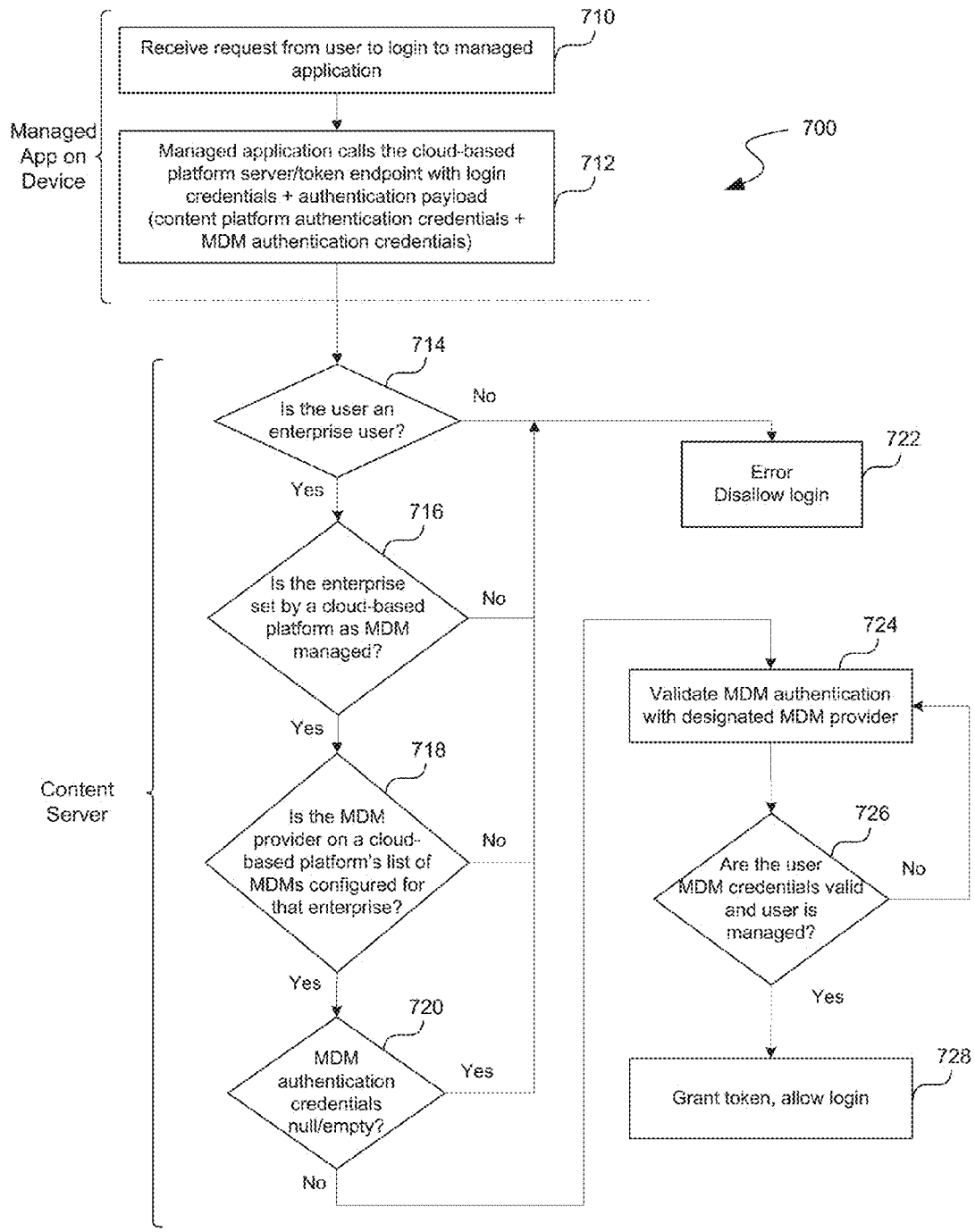
FIG. 7 depicts a data flow diagram illustrating an example process in which a managed application enforces authorization of a user and management of device, according to an embodiment.

FIG. 7 depicts a data flow diagram 700 illustrating an example process in which a managed application enforces authorization of a user and management of a device, according to an embodiment. In this embodiment, only managed users within an enterprise can access the cloud-based platform application via the managed application, provided the supplied MDM credentials are for a provider pre-configured by the enterprise.

Figure 8:
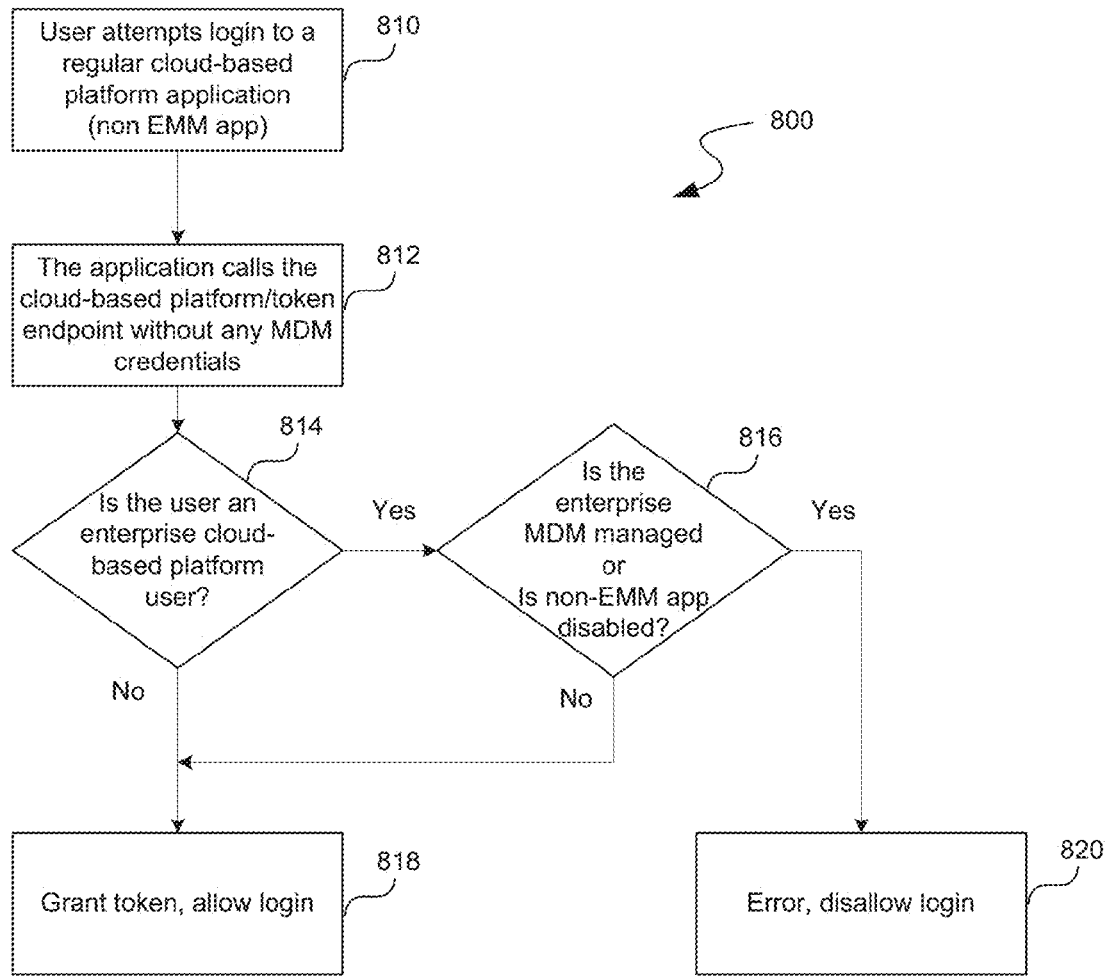
FIG. 8 depicts a data flow diagram illustrating an example cloud-based platform application login flow for managed vs. unmanaged and enterprise and consumer users, according to an embodiment.

FIG. 8 depicts a data flow diagram 800 illustrating an example cloud-based platform application login flow for managed vs. unmanaged and enterprise and consumer users, according to an embodiment. In one embodiment, free cloud-based platform application users and users at non-MDM managed enterprises can login via the regular cloud-based platform application. In one embodiment, the cloud-based platform server maintains a manifest, for each enterprise, of which MDMs (if any) are supported for that enterprise.

Figure 9:
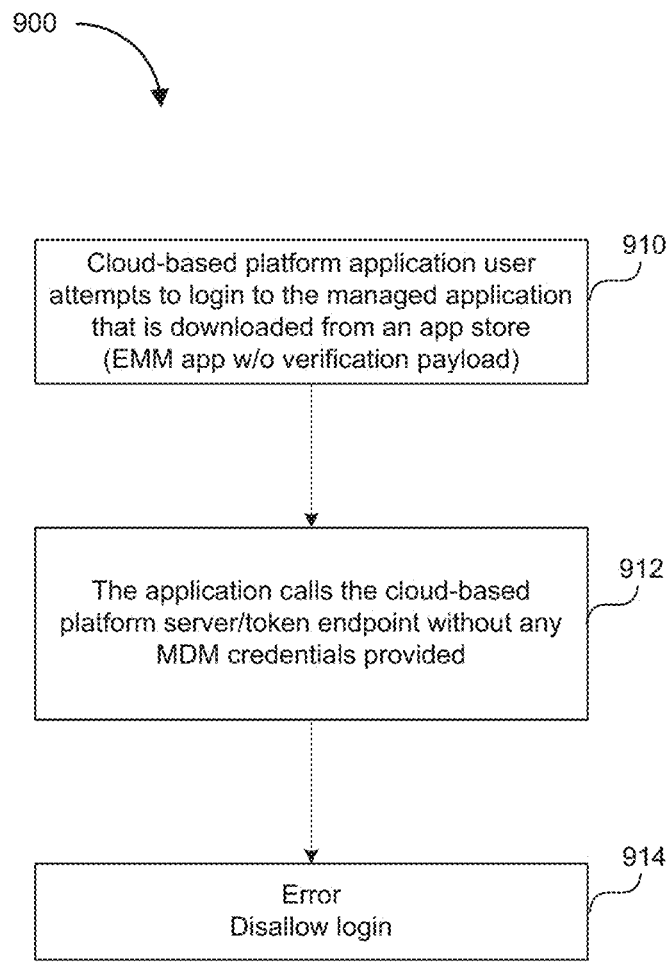
FIG. 9 depicts a data flow diagram 900 illustrating an example login flow for an unauthorized user, according to an embodiment.

FIG. 9 depicts a data flow diagram 900 illustrating an example login flow for an unauthorized user, according to an embodiment. As illustrated, no user can login to the managed application as it has been downloaded directly from an app store; as such, an application will not have any application configuration settings pushed from the MDM server.

Figure 10:
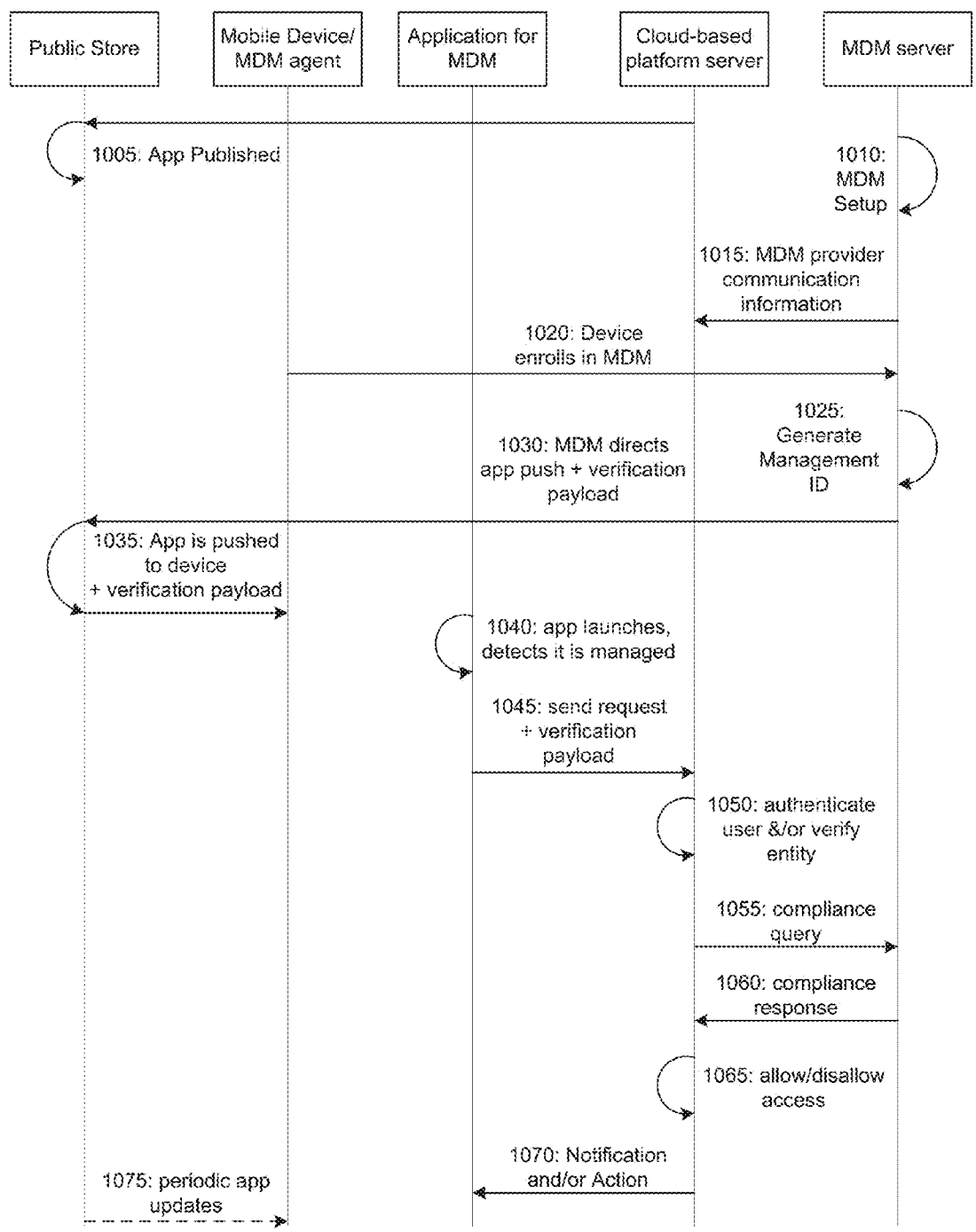
FIG. 10 depicts a sequence diagram illustrating the interaction between various components during the set up and use of a managed application, according to an embodiment.

FIG. 10 depicts a sequence diagram illustrating an example interaction between various components of a cloud-based environment for facilitating mobile device management and verification checking for enterprise mobility management, according to an embodiment. The components include a public store, a mobile device (or MDM agent), an application for MDM (or managed application), a cloud-based platform server (or content server), and an MDM server (MDM provider server).

As illustrated in the example of FIG. 10, at 1005, the content provider platform in the form of a cloud-based platform server publishes an application for MDM (or managed application) to the public store. As discussed herein, the content provider platform can alternatively or additionally publish the app to an MDM private managed app hub such as, for example private managed application hub 435 of FIG. 1 or directly to enterprise platform servers.

At 1010, a cloud-based platform account set up is performed for MDM management of devices. In some embodiments, the cloud-based platform sets up 1-N (i.e., multiple) MDM instances in the account. An MDM provider contains the URL for the MDM server, certificate and token to authenticate to API. This creates a static MDM server ID (MDM_server) which is also referred to herein in whole or in part as MDM provider communication information.

The MDM provider setup can also include installation of the cloud-based platform application for MDM from the public store to publish a {ManagementID} and {MDM_Server} value to the application when installed. The {ManagementID} is a unique token or value given to each application during install of the application. For example, this value can be used to uniquely identify a managed device, a managed user, and/or managed application, etc., when a verification check is made to the MDM API to validate the management status.

At block 1015, the MDM server provides the MDM provider communication information to the cloud-based platform server. At block 1020, the device enrolls in MDM. At 1025, the MDM provider generates and/or otherwise identifies a {ManagementID} and receives a content provider platform index or {PublicID}. As described herein, the {PublicID} uniquely identifies a mobile managed configuration entry for a particular enterprise configuration.

At 1030, the MDM server installs the application on the mobile device. As discussed herein, the MDM can push the application and verification payload to a device and/or direct the push of the applications and/or verification payload from the public store. The verification payload includes the {ManagementID} and {PublicID} values. In some embodiments, e.g., iOS operating systems, MDM API can be used to install the application. In other embodiments, e.g., Android operating systems, the user can be directed to the Playstore to install the application for MDM.

In some embodiments, e.g., iOS based devices, the application can detect that it is managed by reading from the NSUSERDefaults Managed App config key. The {PublicID} and {ManagementID} keys can be included in this list for use in communicating with the cloud-based platform server. In some embodiments, e.g., in the Android based devices, the application can listen for a broadcast message from the MDM agent. The message can include the {ManagementID} and {PublicID} keys to be used to send to the cloud-based platform.

At block 1035, the application is downloaded from the public store to the mobile device. At block 1040, the application launches and detects it is managed by an MDM. The application reads {ManagementID} and {PublicID}. In some embodiments, the user is then prompted for authentication credentials. The application connects to the cloud-based platform server and sends the authentication credentials and the verification payload (e.g., the {ManagementID} and {PublicID} tokens or values). At block 1050, the cloud-based platform server authenticates the user using the authentication credentials and identifies the MDM configuration information including the MDM API settings on the server based on the {PublicID}. At block 1055, the cloud-based platform server calls the MDM API with {ManagementID}. At block 1060, the MDM server responds with Boolean if the application is in a managed state on the device. At block 1065, if allowed, the cloud-based platform server allows data on the device. If denied, at block 1070, the cloud-based platform server optionally sends a command to the application to wipe local data and/or a notification or other action as described herein. At 1075, the application is periodically updated directly from the public store over time.

Figure 11A:
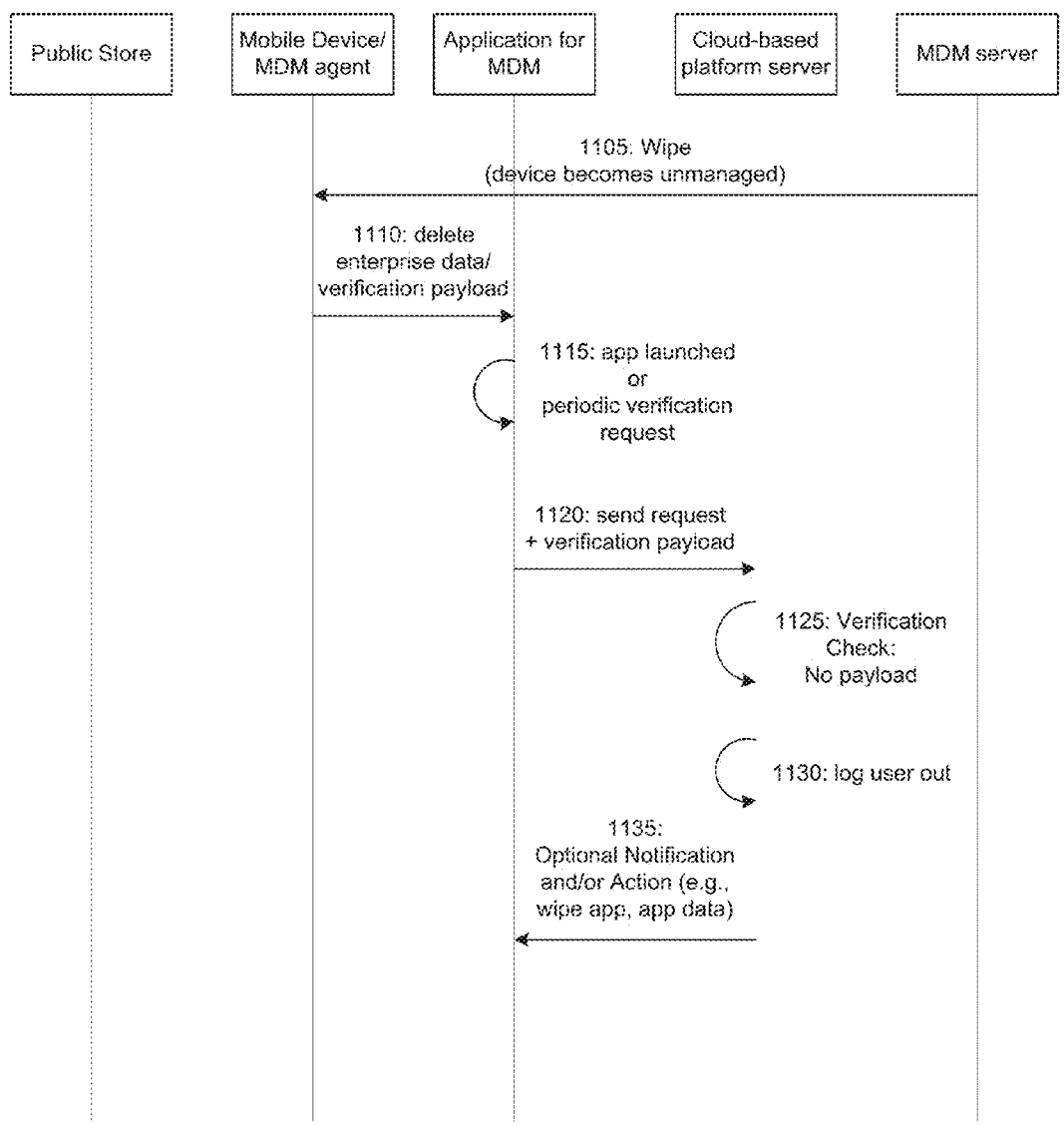
FIGS. 11A and 11B depict a sequence diagram illustrating an example of a device becoming unmanaged after an initial setup or during initial login and operation of a device without of date verification payload attempting to access a content server and requesting updated verification payload, respectively, according to an embodiment.
Figure 11B:
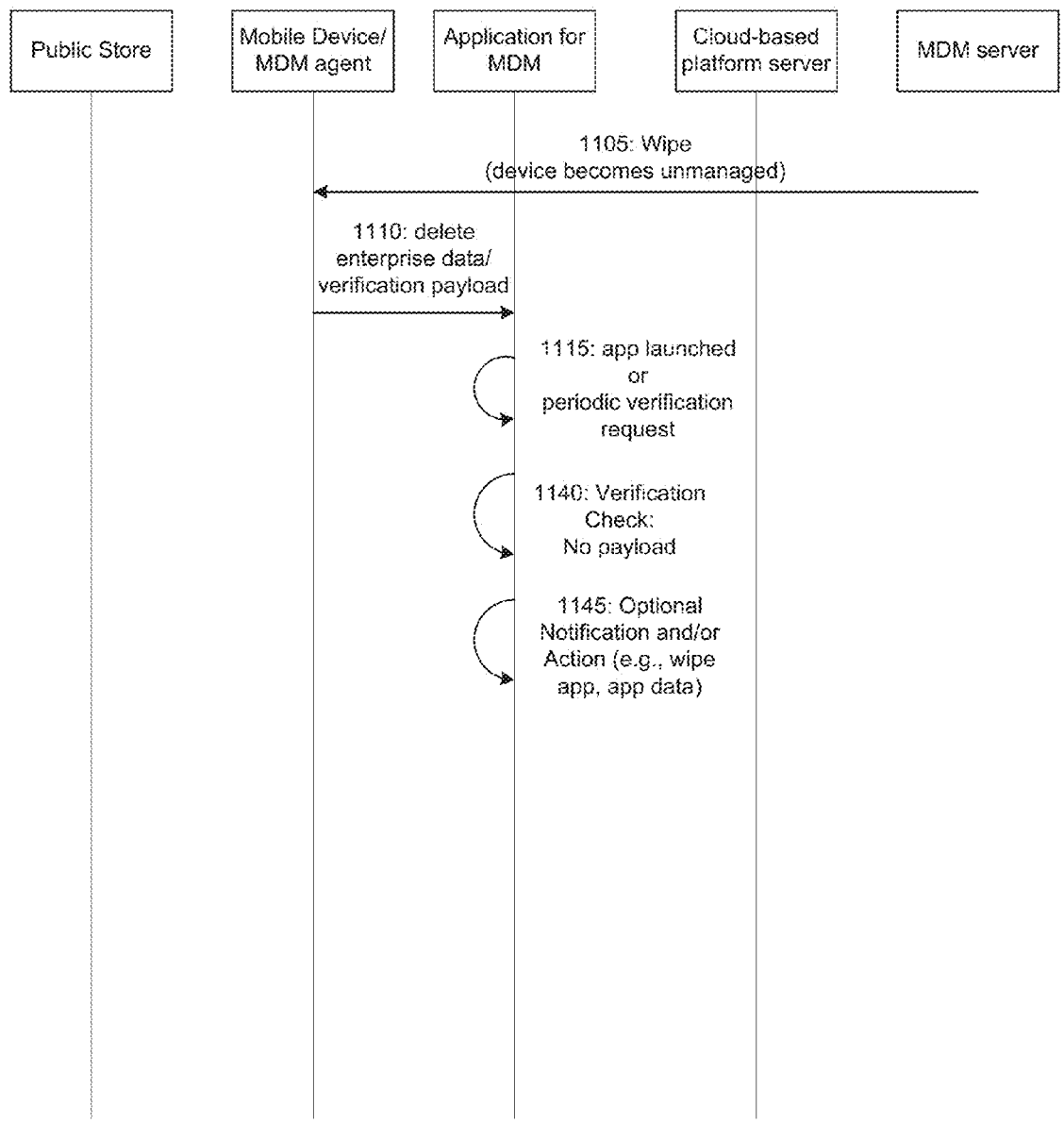
Figure 11C:
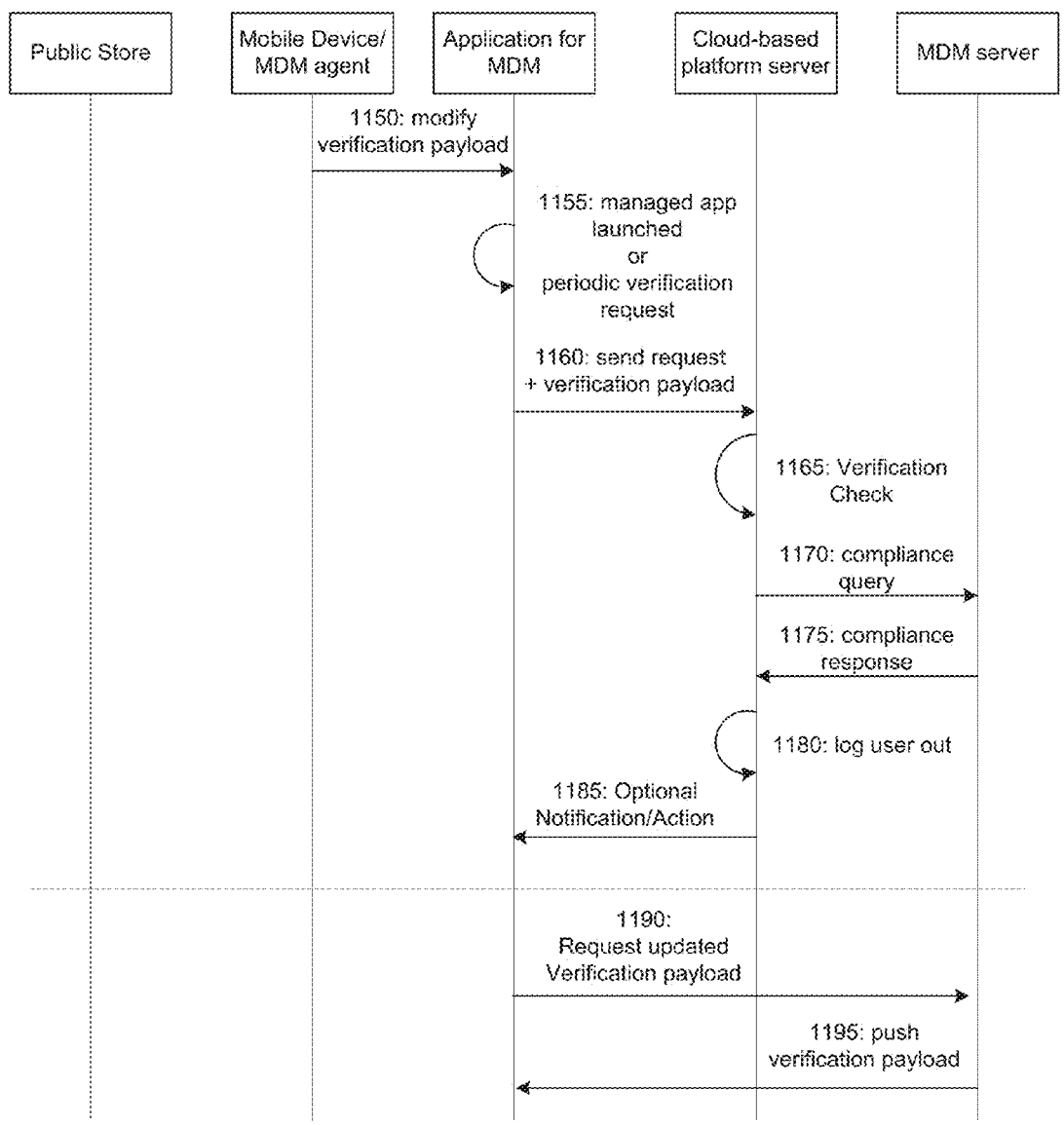
FIG. 11C depicts a sequence diagram illustrating an example operation of a device with out of date and/or otherwise modified verification payload, according to an embodiment.

FIGS. 11A-C depict sequence diagrams illustrating various example scenarios that can occur in a cloud-based environment for facilitating mobile device management and verification checking for enterprise mobility management, according to various embodiments.

Referring first to FIG. 11A, which depicts a sequence diagram illustrating an example of a device becoming unmanaged after an initial setup or during initial login, according to an embodiment, at step 1105, an administrator of an enterprise wipes the device (or MDM agent) from corporate access. As shown in the example of FIG. 11A, the wipe instruction is received via the MDM provider server; however, as discussed, initiation of the wipe instruction occurs as a result of one or more actions taken by the administrator.

At step 1110, the MDM device or agent attempts to delete all corporate data and/or applications from the device including the application for MDM, e.g., the managed application. In some embodiments, in iOS platforms, the managed application can be installed as a managed iOS application via MDM. In this case, when the wipe occurs, the application itself can be deleted and all data associated with the application can be removed. Conversely, in Android OS platforms, the user can be prompted to uninstall the application. For example, a broadcast message can be sent from the MDM agent to the managed application to wipe data locally. At 1115, the formerly managed application is launched by a user of the device. Conversely, an active application can initiate a verification request with the verification payload. The verification payload can include a content provider platform index or {PublicID} and a {ManagementID}; however, as discussed herein, the verification payload can also include additional information and/or values.

At step 1120, the managed application connects to the cloud-based platform server which responsively authenticates the user and attempts to extract the {PublicID} from the verification payload in order to access a mobile management configuration entry for a particular enterprise configuration based on the {PublicID}. However, the information has been wiped and, thus, the verification check fails. At step 1125, the cloud-based platform server logs the user out of the system and, at step 1135, optionally notifies the managed application and/or user. Step 1135 can alternatively or additionally include an instruction or command to wipe remaining data including the application or application data.

Steps 1105 and 1110 of FIG. 11B are similar to those of FIG. 11A; however, in the example of FIG. 11B, the managed application includes additional client-based verification functionality to verify that a payload exists prior to sending a request to the cloud-based platform server. Additionally, in the example of FIG. 11B, the cloud-based platform server can automatically log the user out of the cloud-based platform server if no payload exists. Specifically, at step 1140, the managed application attempts to generate a request for the cloud-based platform server, but determines that one or more values of the verification payload are empty. At step 1145, the managed application optionally directs the device to wipe remaining data including the application itself and/or data associated with the application or corresponding enterprise.

FIG. 11C depicts a sequence diagram illustrating an example operation of a device with out of date and/or otherwise modified verification payload, according to an embodiment.

At step 1150, the MDM device or agent or user of the device attempts to modify some or all of the verification payload information. At 1155, the managed application is launched by a user of the device. Conversely, an active application can initiate a verification request with the verification payload. The verification payload can include a content provider platform index or {PublicID} and a {ManagementID}; however, as discussed herein, the verification payload can also include additional information and/or values.

At step 1160, the managed application connects to the cloud-based platform server which responsively authenticates the user and extracts the {PublicID} from the verification payload in order to access a mobile management configuration entry for a particular enterprise configuration based on the {PublicID}. At step 1165, the cloud-based platform server processes the mobile management configuration entry for a particular enterprise to identify the enterprise and MDM communication information. At step 1170, the cloud-based platform server generates a compliance query based on the MDM communication information. The compliance query can include the {ManagementID} and/or additional verification payload information.

At step 1175, the cloud-based platform server receives a compliance response indicating whether or not enterprise mobility management compliance requirements are satisfied, e.g., whether the managed application is in compliance. In the example of FIG. 11C, the verification payload has been modified and, thus, the response indicates non-compliance. At step 1180, the cloud-based platform server logs the user out of the system and, at step 1185, optionally notifies the managed application and/or user. Step 1185 can alternatively or additionally include an instruction or command to wipe remaining data including the application or application data.

At step 1190, the managed application optionally requests updated verification payload information. Lastly, at step 1195, new verification payload information and or a new managed application instance may be pushed out to the device.

Example Device Management MDM API Definitions

Management Status Application Settings:

When an application is installed on a device using MDM, the MDM server can generate a unique identifier for that application and send it to the application. The managed application settings can include the following key-value pairs as illustrated in Table 1.

TABLE 1

| Key | Type | Value |
|---|---|---|
| ManagementID | String | Unique ID for this device, generated specifically for this app |
| MDMServerID | String | Optional. Can be used to associate the application to the MDM server (if single account may be using multiple servers |

In iOS, an MDM server can use configuration and feedback dictionaries to communicate with and configure third-party managed applications. The configuration dictionary can provide one-way communication from the MDM server to the application. An application can access its (read-only) configuration dictionary by reading the key com.apple.configuration.managed using the NSUserDefaults class. A managed application can respond to new configurations that arrive while the application is running by observing the NSUserDefaultsDidChangeNotification notification.

In some embodiments, on Android, there is no native MDM command for configuring applications. To provide the same capability on Android, the MDM agent can facilitate the application configuration using a broadcast intent. When the app is published from the MDM console, the MDM agent will receive the managed app settings. Once received, the MDM app will listen for the app installation event to detect when the app is installed. As soon as the app is installed, the MDM Agent will broadcast the intent to the app as long as the app is modified with the following, the app will launch automatically upon receiving the broadcast intent.

AndroidManifest.xml

```
<receiver android:name="packagename.ManagedAppInfoRecevier"
        android:permission="packagename.ManagedAppInfo.SEND">
    <intent-filter>
        <action android:name=
        "packagename.MANAGED_CONFIGURATION" />
    </intent-filter>
</receiver>
```

ManagedAppInfoRecevier.java
```
public class ManagedAppInfoRecevier extends BroadcastReceiver
{
    @Override
    public void onReceive(Context context, Intent intent) {
    String settings = intent.getStringExtra("managed_configuration");
    // Persist the received value for further use.
    }
}
```

Management Status Change Notification:

When app is installed on a device using MDM, the MDM client on the device track, the app as a managed app, can ask the app to be removed when the device is unenrolled from MDM.

On iOS, managed apps can be removed automatically by the operating system when the device is unenrolled from MDM.

In some embodiments, on Android, there is no native MDM concept for managed applications. It is the responsibility of the MDM vendor to provide a client (e.g. MDM Agent) to manage and track applications. To notify enterprise apps when the device is unenrolled, the agent can send a notification to all managed apps using a broadcast intent. As long as the app is modified with the following, the app can launch automatically upon receiving the broadcast intent.

AndroidManifest.xml
```
<receiver android:name="packagename.ManagementStatusRecevier"
android:permission="packagename.ManagementStatusInfo.SEND">
    <intent-filter>
        <action android:name=
"packagename.MANAGEMENT_STATUS_CHANGE"/>
    </intent-filter>
</receiver>
```

ManagementStatusRecevier.java
```
public class ManagementStatusRecevier extends BroadcastReceiver
{
    @Override
    public void onReceive(Context context, Intent intent) {
        String settings =    intent.getStringExtra
        ("management_status_change");
        // Persist the received value for further use.
    }
}
```

Server Management Status API: Get Management Status. In some embodiments, the logic includes cloud-based platform client/server making a call with ManagementID and application BundleID. AW can validate ManagementID against Mobilemanagement.authenticationtoken table. AW can return application management status.

Method: GET
Example Request:
https://host/API/v1/mdm/devices/managementstatus
https://host/API/v1/mam/apps/managementstatus
Sample XML:

```
<DeviceApplication>
    <ManagementID></ManagementID>
    <BundleID></BundleID>
</DeviceApplication>
```

| Attribute | Required | Description | Data Type | Example |
| --- | --- | --- | --- | --- |
| ManagementID | Yes | Device management identifier | String | 1234ABCD |
| BundleID | Yes | Applcation bundle identifier | String | com.MDM.agent |

Example Response

| State | HTTP Code | Custom Message |
| --- | --- | --- |
| Success | 200 | OK |
| Failure | 500 | Internal Server Error |

Response XML:

```
<ManagementStatus></MangaementStatus>
```

| Attribute | Description | Data Type | Example |
| --- | --- | --- | --- |
| ManagementStatus | Device application management status | Int | 0 = Not managed<br>1 = Managed |

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Figure 12:
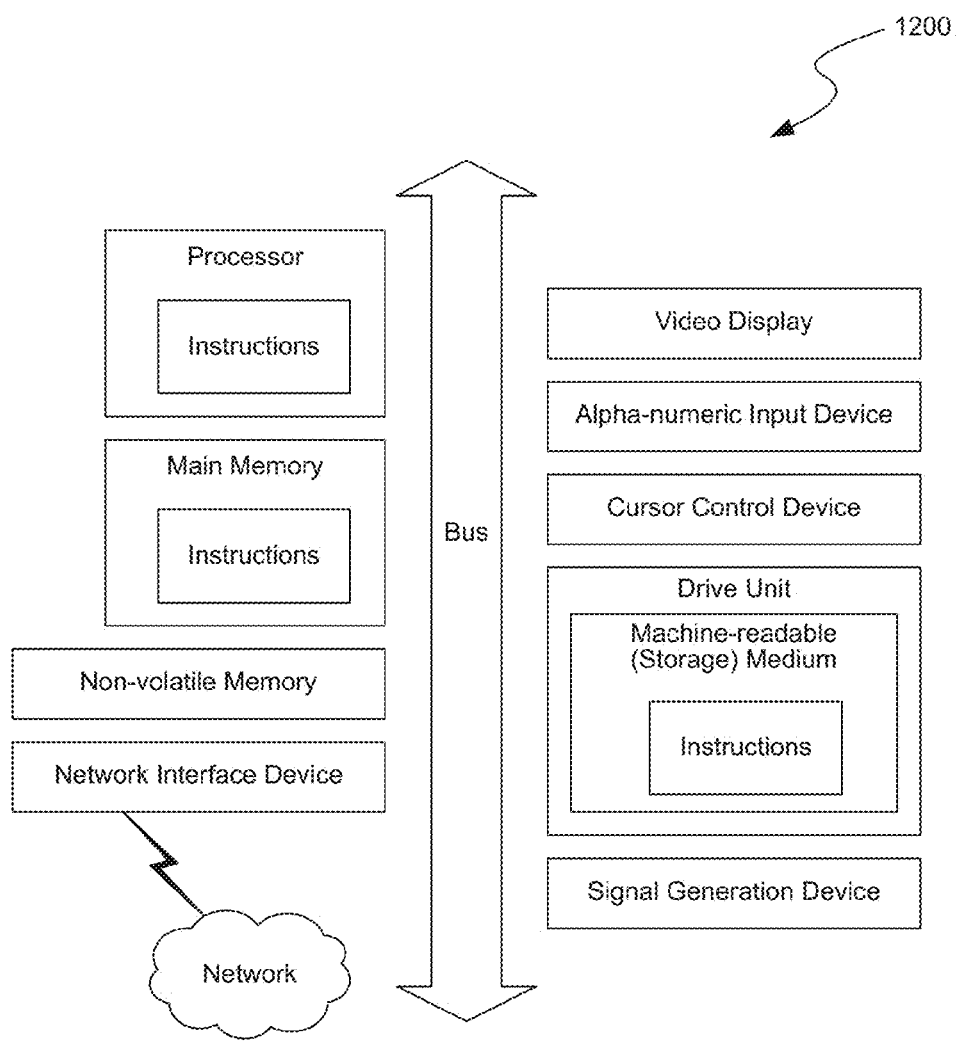
FIG. 12 depicts a diagrammatic representation of a machine in the example form of a computer system within which a set of instructions, for causing the machine to perform any one or more of the methodologies discussed herein, can be executed.

FIG. 12 shows a diagrammatic representation 1200 of a machine, in the example form of a computer system, within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1300 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including, for example, the access and operation rights of an object by an individual, a machine, and/or an application, and the circumstances under which the permission rights stand.

Other network security functions that can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112(f), other aspects can likewise be embodied as a means-plus-function claim, or in other forms, such as being embodied in a computer-readable medium. (Any claim intended to be treated under 35 U.S.C. §112(f) begins with the words "means for"). Accordingly, the applicant reserves the right to add additional claims after filing the application to pursue such additional claim forms for other aspects of the disclosure.

What is claimed is:

1. A method of verifying a managed application associated with an enterprise via a content server, the method comprising:
    receiving, by one or more processors of the content server, a verification request initiated by the managed application on a mobile device,
        wherein the verification request includes a verification payload;
    extracting, by the one or more processors of the content server, a first portion and a second portion of the verification payload,
        wherein the first portion of the verification payload identifies a first mobile management configuration entry;
    accessing, by the one or more processors of the content server, the first mobile management configuration entry to identify the enterprise and mobile device management (MDM) information corresponding to the enterprise,
        wherein the MDM information indicates a first MDM configuration for the enterprise; and
    generating, by the one or more processors of the content server, a compliance query based on the MDM information associated with the enterprise to verify the managed application associated with the enterprise,
        wherein the compliance query includes the second portion of the verification payload.

2. The method of claim 1, further comprising:
    verifying, by the one or more processors of the content server, that a user of the managed application belongs to the enterprise.

3. The method of claim 2, wherein verifying that the user belongs to the enterprise comprises:
    cross-referencing an enterprise indicated by received user credentials with the enterprise indicated by the first mobile management configuration entry; and
    disallowing the managed application to access the content server if the enterprise indicated by the user credentials does not match the enterprise indicated by the first mobile management configuration entry.

4. The method of claim 1, wherein the verification request is initiated periodically by the managed application on the mobile device.

5. The method of claim 1, further comprising:
    receiving, by the one or more processors of the content server, an authentication request initiated by the managed application on the mobile device,
        wherein the authentication request includes user credentials associated with the user of the managed application and the verification payload; and
    authenticating the user with the content server using the user credentials.

6. The method of claim 5, further comprising:
    sending the compliance query for delivery to an MDM server associated with an MDM provider,
        wherein the information corresponding to the enterprise identifies the MDM server and the MDM provider.

7. The method of claim 1, further comprising:
    receiving, by the one or more processors of the content server, a compliance response initiated by the MDM server, the compliance response indicating that the enterprise compliance requirements have been satisfied; and
    allowing the managed application to access the content server.

8. The method of claim 1, further comprising:
    receiving, by the one or more processors of the content server, a compliance response initiated by the MDM server indicating that the enterprise compliance requirements have not been satisfied; and
    disallowing the managed application to access the content server.

9. The method of claim 1, wherein the verification payload is in the form of multiple key-value pairs.

10. The method of claim 9, wherein the first portion of the verification payload comprises a public identifier (ID) and the second portion of the verification payload comprises a management ID.

11. The method of claim 10, wherein the management ID uniquely identifies the user for verification that the user is a managed user or uniquely identifies the device for verification that the device is valid.

12. The method of claim 1, wherein the MDM information indicates the first of multiple MDM configurations for the enterprise.

13. The method of claim 1, wherein the content server belongs to a cloud-based collaboration platform and the managed application comprises a cloud-based collaboration application.

14. A method of verifying a managed application associated with an enterprise via a content server, the method comprising:
    receiving, by the one or more processors of the content server, an authentication request initiated by the managed application on the mobile device,
        wherein the authentication request includes user credentials associated with a user of the managed application and the verification payload;

authenticating the user with the content server using the user credentials;

extracting, by the or more processors of the content server, a first portion and a second portion of a verification payload,
- wherein the first portion of the verification payload identifies a first mobile management configuration entry on the content server;

accessing, by the one or more processors of the content server, the first mobile management configuration entry to identify the enterprise and mobile device management (MDM) information corresponding to the enterprise,
- wherein the MDM information indicates a first MDM configuration for the enterprise;

verifying, by the one or more processors of the content server, that the user belongs to the enterprise;

generating, by the one or more processors of the content server, a compliance query based on the MDM information associated with the enterprise to verify the managed application associated with the enterprise,
- wherein the compliance query includes the second portion of the verification payload; and sending the compliance query for delivery to an MDM server associated with an MDM provider,
- wherein the information corresponding to the enterprise identifies the MDM server and the MDM provider.

15. The method of claim 14, wherein verifying that the user belongs to the enterprise comprises:
- identifying an enterprise using the user credentials associated with the user of the managed application;
- comparing the enterprise identified using the user credentials with the enterprise indicated by the first mobile management configuration entry and
- disallowing the managed application to access the content server if the enterprise indicated by the user credentials does not match the enterprise indicated by the first mobile management configuration entry.

16. The method of claim 14, further comprising:
- receiving, via a console of the content server, the MDM information corresponding to the first MDM configuration for the enterprise; and
- populating the first mobile management configuration entry for the enterprise with the MDM information.

17. The method of claim 14, wherein the MDM information comprises one or more of an MDM server address, MDM authentication information, MDM type information, MDM tier information, or MDM communication information.

18. A system for verifying a managed application associated with an enterprise, the system comprising:
- a repository configured to store enterprise mobile management entries identifying one or more mobile device management (MDM) configurations for each of multiple enterprises;
- a content server communicatively coupled to the repository, the content server including:
  - one or more processors;
  - an application program interface (API) configured to receive a request initiated by a user of the managed application on a mobile device, the request including a verification payload;
  - a verification engine configured to:
    - extract a first portion and a second portion of the verification payload, the first portion of the verification payload identifying a first mobile management configuration entry in the repository;
    - access the first mobile management configuration entry to identify an enterprise and MDM information corresponding to the enterprise; and
  - an MDM query engine configured to generate a compliance query based on the MDM information corresponding to the enterprise to verify the managed application associated with the enterprise, the compliance query including the second portion of the verification payload.

19. The system of claim 18, wherein the request comprises an authentication request further including user credentials associated with the user of the managed application, wherein the verification engine is further configured to:
- verify that the user belongs to the enterprise by:
  - identifying an enterprise indicated by the user credentials associated with the user of the managed application;
  - cross-referencing the enterprise indicated by user credentials with the enterprise indicated by the first mobile management configuration entry; and
  - disallow access to the content server by the managed application if the enterprise indicated by the user credentials does not match the enterprise indicated by the first mobile management configuration entry.

20. A machine-readable storage device having instructions stored thereon, which when executed by one or more processors of a computer system, cause the computer system to: process a verification request initiated by a user of the managed application on a mobile device, the verification request including a verification payload; extract a first portion and a second portion of the verification payload, wherein the first mobile management configuration entry identifies a first mobile management configuration entry associated with the content server; access the first mobile management configuration entry to identify the enterprise and mobile device management (MDM) information corresponding to the enterprise, the MDM information indicating a first MDM configuration for the enterprise; and generate a compliance query based on the MDM information associated with the enterprise to verify the managed application associated with the enterprise, the compliance query including the second portion of the verification payload.

* * * * *